(12) United States Patent
Zhang et al.

(10) Patent No.: US 10,965,514 B2
(45) Date of Patent: Mar. 30, 2021

(54) TRAINING FIELD ASSISTED MEDIUM SENSING ACROSS MULTIPLE RADIO ACCESS TECHNOLOGIES

(71) Applicant: QUALCOMM Incorporated, San Diego, CA (US)

(72) Inventors: Xiaoxia Zhang, San Diego, CA (US); Yongbin Wei, La Jolla, CA (US); Tamer Kadous, San Diego, CA (US); Zhifei Fan, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/168,629

(22) Filed: Oct. 23, 2018

(65) Prior Publication Data

US 2019/0158333 A1 May 23, 2019

Related U.S. Application Data

(60) Provisional application No. 62/588,100, filed on Nov. 17, 2017.

(51) Int. Cl.
*H04L 27/26* (2006.01)
*H04L 27/00* (2006.01)
(Continued)

(52) U.S. Cl.
CPC ...... *H04L 27/2659* (2013.01); *H04L 25/0204* (2013.01); *H04L 27/0006* (2013.01);
(Continued)

(58) Field of Classification Search
CPC ............. H04L 25/0204; H04L 27/0006; H04L 27/2278; H04L 27/261; H04L 27/2613;
(Continued)

(56) References Cited

U.S. PATENT DOCUMENTS 10,027,455 B2 * 7/2018 Kim ...................... H04L 5/0048
10,104,692 B2 * 10/2018 Khawer ............ H04W 74/0816
(Continued)

FOREIGN PATENT DOCUMENTS

| WO | WO-2014081421 A1 | 5/2014 |
| WO | WO-2016100287 A1 | 6/2016 |
| WO | WO-2016133726 A1 | 8/2016 |

OTHER PUBLICATIONS

Partial International Search Report—PCT/US2018/057407—ISA/EPO—dated Jan. 29, 2019.
(Continued)

*Primary Examiner* — Luat Phung
*Assistant Examiner* — Thomas R Cairns
(74) *Attorney, Agent, or Firm* — Holland & Hart LLP

(57) ABSTRACT

Methods, systems, and devices for wireless communications are described. In some wireless systems, different wireless devices may communicate using different radio access technologies (RATs) in a shared radio frequency spectrum. Prior to communicating on a channel in the shared radio frequency spectrum, a wireless device may transmit a training field as part of a preamble in a transmission on the channel to reserve the channel for the transmission. As described herein, a training field transmitted by a wireless device using one RAT may be transmitted with an autocorrelation property associated with training fields of another RAT. As such, a wireless device configured to communicate using the other RAT may be able to receive and identify the training field (e.g., based on the autocorrelation property), and the wireless device may use the additional techniques described herein to determine an availability of the channel based on the training field.

26 Claims, 14 Drawing Sheets

(51) Int. Cl.
*H04L 25/02* (2006.01)
*H04L 27/227* (2006.01)
*H04W 72/04* (2009.01)
*H04W 16/14* (2009.01)

(52) U.S. Cl.
CPC ........ *H04L 27/2278* (2013.01); *H04L 27/261* (2013.01); *H04L 27/2613* (2013.01); *H04W 72/0453* (2013.01); *H04W 16/14* (2013.01)

(58) Field of Classification Search
CPC .............. H04L 27/2659; H04W 16/14; H04W 72/0453
See application file for complete search history.

(56) References Cited

U.S. PATENT DOCUMENTS

| | | | |
|---|---|---|---|
| 10,284,408 B2 * | 5/2019 | Yi | H04W 16/14 |
| 10,362,573 B2 * | 7/2019 | Halabian | H04L 27/2602 |
| 2015/0195849 A1 | 7/2015 | Bashar et al. | |
| 2017/0105229 A1 * | 4/2017 | Luo | H04W 72/042 |

OTHER PUBLICATIONS

International Search Report and Written Opinion—PCT/US2018/057407—ISA/EPO—dated Mar. 28, 2019.

* cited by examiner

TRAINING FIELD ASSISTED MEDIUM SENSING ACROSS MULTIPLE RADIO ACCESS TECHNOLOGIES

CROSS REFERENCES

The present Application for Patent claims the benefit of U.S. Provisional Patent Application No. 62/588,100 by ZHANG et al., entitled "TRAINING FIELD ASSISTED MEDIUM SENSING ACROSS MULTIPLE RADIO ACCESS TECHNOLOGIES," filed Nov. 17, 2017, assigned to the assignee hereof and expressly incorporated by reference in its entirety.

BACKGROUND

The following relates generally to wireless communication and more specifically to training field assisted medium sensing across multiple radio access technologies (RATs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) system, an LTE-Advanced (LTE-A) system, or an LTE-A Pro system, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some cases, wireless devices in different wireless networks (e.g., NR networks and Wireless Local Area Networks (WLANs)) may communicate using different RATs over a shared radio frequency spectrum. In such cases, it may be challenging for the wireless devices in the different wireless networks to coordinate with each other to prevent or limit interference in the shared radio frequency spectrum, which may result in packet loss and reduced throughput in the wireless networks.

SUMMARY

In some wireless systems, different wireless devices may communicate using different radio access technologies (RATs) in a shared radio frequency spectrum. Prior to communicating on a channel in the shared radio frequency spectrum, a wireless device may transmit a training field as part of a preamble in a transmission on the channel to reserve the channel for the transmission. As described herein, a wireless device may transmit a training field using one RAT with an autocorrelation property associated with training fields of another RAT. As such, a wireless device configured to communicate using the other RAT may be able to receive and identify the training field (e.g., based on the autocorrelation property), and the wireless device may use additional techniques described herein to determine an availability of the channel based on the training field.

A method for wireless communication is described. The method may include identifying, at a first wireless device, information to transmit to a second wireless device via a channel in a shared radio frequency spectrum using a first RAT, the first RAT associated with a first numerology, generating a cross-RAT training field using the first numerology, the cross-RAT training field having an autocorrelation property, the autocorrelation property associated with a set of subcarriers and a repetition period of a training field for a second RAT associated with a second numerology, and transmitting the cross-RAT training field on the channel to reserve the channel for transmitting the information.

An apparatus for wireless communication is described. The apparatus may include means for identifying, at a first wireless device, information to transmit to a second wireless device via a channel in a shared radio frequency spectrum using a first RAT, the first RAT associated with a first numerology, means for generating a cross-RAT training field using the first numerology, the cross-RAT training field having an autocorrelation property, the autocorrelation property associated with a set of subcarriers and a repetition period of a training field for a second RAT associated with a second numerology, and means for transmitting the cross-RAT training field on the channel to reserve the channel for transmitting the information.

Another apparatus for wireless communication is described. The apparatus may include a processor, memory coupled to the processor, and instructions stored in the memory. The instructions may be operable to cause the processor to identify, at a first wireless device, information to transmit to a second wireless device via a channel in a shared radio frequency spectrum using a first RAT, the first RAT associated with a first numerology, generate a cross-RAT training field using the first numerology, the cross-RAT training field having an autocorrelation property, the autocorrelation property associated with a set of subcarriers and a repetition period of a training field for a second RAT associated with a second numerology, and transmit the cross-RAT training field on the channel to reserve the channel for transmitting the information.

A non-transitory computer-readable medium for wireless communication is described. The non-transitory computer-readable medium may include instructions operable to cause a processor to identify, at a first wireless device, information to transmit to a second wireless device via a channel in a shared radio frequency spectrum using a first RAT, the first RAT associated with a first numerology, generate a cross-RAT training field using the first numerology, the cross-RAT training field having an autocorrelation property, the autocorrelation property associated with a set of subcarriers and a repetition period of a training field for a second RAT associated with a second numerology, and transmit the cross-RAT training field on the channel to reserve the channel for transmitting the information.

In some aspects of the method, apparatus, and non-transitory computer-readable medium described above, the first numerology includes a first subcarrier spacing and a first symbol duration, and the second numerology includes a second subcarrier spacing different from the first subcarrier spacing and a second symbol duration different from the first symbol duration. In some aspects of the method, apparatus, and non-transitory computer-readable medium described above, the generating includes generating the cross-RAT training field using a sampling duration that may be an integer fraction of the first symbol duration.

In some aspects of the method, apparatus, and non-transitory computer-readable medium described above, the number of null subcarriers between subcarriers of the cross-RAT training field is different from a number of null subcarriers between subcarriers in the set of subcarriers of the training field for the second RAT. In some aspects of the method, apparatus, and non-transitory computer-readable medium described above, a difference between a first duration of a first time period spanned by the cross-RAT training field and a second duration of a second time period spanned by the training field for the second RAT may be within a threshold. In some aspects of the method, apparatus, and non-transitory computer-readable medium described above, the cross-RAT training field includes a short training field (STF).

A method for wireless communication is described. The method may include monitoring a channel in a shared radio frequency spectrum to determine an availability of the channel for a transmission using a first RAT, detecting a training field of a signal on the channel based at least in part on the monitoring, determining that the training field was transmitted by a device associated with a second RAT based at least in part on a failure to detect a second field in the signal associated with transmissions using the first RAT, detecting a reference energy level of the signal based at least in part on the training field, identifying an end of a transmission opportunity associated with the signal based at least in part on detecting that the energy level of the channel is below an energy threshold for a predefined time period, where the energy threshold is based at least in part on the reference energy level of the signal, and resuming a channel access procedure to access the channel for the transmission based at least in part on the identified end of the transmission opportunity.

An apparatus for wireless communication is described. The apparatus may include means for monitoring a channel in a shared radio frequency spectrum to determine an availability of the channel for a transmission using a first RAT, means for detecting a training field of a signal on the channel based at least in part on the monitoring, means for determining that the training field was transmitted by a device associated with a second RAT based at least in part on a failure to detect a second field in the signal associated with transmissions using the first RAT, means for detecting a reference energy level of the signal based at least in part on the training field, means for identifying an end of a transmission opportunity associated with the signal based at least in part on detecting that the energy level of the channel is below an energy threshold for a predefined time period, where the energy threshold is based at least in part on the reference energy level of the signal, and means for resuming a channel access procedure to access the channel for the transmission based at least in part on the identified end of the transmission opportunity.

Another apparatus for wireless communication is described. The apparatus may include a processor, memory coupled to the processor, and instructions stored in the memory. The instructions may be operable to cause the processor to monitor a channel in a shared radio frequency spectrum to determine an availability of the channel for a transmission using a first RAT, detect a training field of a signal on the channel based at least in part on the monitoring, determine that the training field was transmitted by a device associated with a second RAT based at least in part on a failure to detect a second field in the signal associated with transmissions using the first RAT, detect a reference energy level of the signal based at least in part on the training field, identify an end of a transmission opportunity associated with the signal based at least in part on detecting that the energy level of the channel is below an energy threshold for a predefined time period, where the energy threshold is based at least in part on the reference energy level of the signal, and resume a channel access procedure to access the channel for the transmission based at least in part on the identified end of the transmission opportunity.

A non-transitory computer-readable medium for wireless communication is described. The non-transitory computer-readable medium may include instructions operable to cause a processor to monitor a channel in a shared radio frequency spectrum to determine an availability of the channel for a transmission using a first RAT, detect a training field of a signal on the channel based at least in part on the monitoring, determine that the training field was transmitted by a device associated with a second RAT based at least in part on a failure to detect a second field in the signal associated with transmissions using the first RAT, detect a reference energy level of the signal based at least in part on the training field, identify an end of a transmission opportunity associated with the signal based at least in part on detecting that the energy level of the channel is below an energy threshold for a predefined time period, where the energy threshold is based at least in part on the reference energy level of the signal, and resume a channel access procedure to access the channel for the transmission based at least in part on the identified end of the transmission opportunity.

In some aspects of the method, apparatus, and non-transitory computer-readable medium described above, the second field includes a long training field (LTF) or a legacy signal (L-SIG) field. In some aspects of the method, apparatus, and non-transitory computer-readable medium described above, the second field includes a downlink control information (DCI) field.

Some examples of the method, apparatus, and non-transitory computer-readable medium described above may further include processes, features, means, or instructions for monitoring the channel to determine the availability of the channel for the transmission as part of the channel access procedure, detecting a second training field of a second signal on the channel, identifying that the second training field was transmitted by a second device associated with the second RAT based at least in part on a failure to detect the second field in the signal associated with transmissions using the first RAT, detecting a second reference energy level of the second signal based at least in part on the second training field, and resuming the channel access procedure to access the channel for the transmission based at least in part on determining that the second reference energy level may be below an edge detection energy threshold. In some aspects of the method, apparatus, and non-transitory computer-readable medium described above, the reference energy level may be determined based at least in part on energy detected within a predetermined time duration after the training field. In some aspects of the method, apparatus, and non-transitory computer-readable medium described above, the channel access procedure includes a countdown of a backoff timer prior to channel access for the transmission.

A method for wireless communication is described. The method may include monitoring a channel in a shared radio frequency spectrum to determine an availability of the channel for a transmission using a first RAT, detecting a training field of a signal on the channel based at least in part on the monitoring, determining that the training field was transmitted by a device associated with a second RAT based at least in part on a failure to detect a second field in the signal associated with transmissions using the first RAT, identifying a transmission opportunity backoff time period based at least in part on determining that the training field is associated with the second RAT, and resuming a channel access procedure to access the channel for the transmission after the transmission opportunity backoff time period.

An apparatus for wireless communication is described. The apparatus may include means for monitoring a channel in a shared radio frequency spectrum to determine an availability of the channel for a transmission using a first RAT, means for detecting a training field of a signal on the channel based at least in part on the monitoring, means for determining that the training field was transmitted by a device associated with a second RAT based at least in part on a failure to detect a second field in the signal associated with transmissions using the first RAT, means for identifying a transmission opportunity backoff time period based at least in part on determining that the training field is associated with the second RAT, and means for resuming a channel access procedure to access the channel for the transmission after the transmission opportunity backoff time period.

Another apparatus for wireless communication is described. The apparatus may include a processor, memory coupled to the processor, and instructions stored in the memory. The instructions may be operable to cause the processor to monitor a channel in a shared radio frequency spectrum to determine an availability of the channel for a transmission using a first RAT, detect a training field of a signal on the channel based at least in part on the monitoring, determine that the training field was transmitted by a device associated with a second RAT based at least in part on a failure to detect a second field in the signal associated with transmissions using the first RAT, identify a transmission opportunity backoff time period based at least in part on determining that the training field is associated with the second RAT, and resume a channel access procedure to access the channel for the transmission after the transmission opportunity backoff time period.

A non-transitory computer-readable medium for wireless communication is described. The non-transitory computer-readable medium may include instructions operable to cause a processor to monitor a channel in a shared radio frequency spectrum to determine an availability of the channel for a transmission using a first RAT, detect a training field of a signal on the channel based at least in part on the monitoring, determine that the training field was transmitted by a device associated with a second RAT based at least in part on a failure to detect a second field in the signal associated with transmissions using the first RAT, identify a transmission opportunity backoff time period based at least in part on determining that the training field is associated with the second RAT, and resume a channel access procedure to access the channel for the transmission after the transmission opportunity backoff time period.

In some aspects of the method, apparatus, and non-transitory computer-readable medium described above, the second field includes an LTF or an L-SIG field. In some aspects of the method, apparatus, and non-transitory computer-readable medium described above, the second field includes a DCI field.

Some examples of the method, apparatus, and non-transitory computer-readable medium described above may further include processes, features, means, or instructions for receiving a threshold number of subsequent training fields transmitted on the channel by one or more devices associated with the second RAT, where each of the subsequent training fields may be received within a respective backoff time period of a previous training field, and resuming the channel access procedure to access the channel for the transmission based at least in part on receiving the threshold number of subsequent training fields. In some aspects of the method, apparatus, and non-transitory computer-readable medium described above, a duration of the transmission opportunity backoff time period corresponds to a maximum duration of a transmission opportunity on the channel for the first RAT and the second RAT. In some aspects of the method, apparatus, and non-transitory computer-readable medium described above, the channel access procedure includes a countdown of a backoff timer prior to channel access for the transmission.

A method for wireless communication is described. The method may include monitoring a channel in a shared radio frequency spectrum using a first energy detection threshold to determine an availability of the channel for a transmission using a first RAT, receiving a training field on the channel based at least in part on the monitoring, determining whether the training field is associated with the first RAT or a second RAT, identifying a second energy detection threshold for monitoring the channel based at least in part on the determining, and monitoring the channel using the second energy detection threshold to determine the availability of the channel for the transmission using the first RAT.

An apparatus for wireless communication is described. The apparatus may include means for monitoring a channel in a shared radio frequency spectrum using a first energy detection threshold to determine an availability of the channel for a transmission using a first RAT, means for receiving a training field on the channel based at least in part on the monitoring, means for determining whether the training field is associated with the first RAT or a second RAT, means for identifying a second energy detection threshold for monitoring the channel based at least in part on the determining, and means for monitoring the channel using the second energy detection threshold to determine the availability of the channel for the transmission using the first RAT.

Another apparatus for wireless communication is described. The apparatus may include a processor, memory coupled to the processor, and instructions stored in the memory. The instructions may be operable to cause the processor to monitor a channel in a shared radio frequency spectrum using a first energy detection threshold to determine an availability of the channel for a transmission using a first RAT, receive a training field on the channel based at least in part on the monitoring, determine whether the training field is associated with the first RAT or a second RAT, identify a second energy detection threshold for monitoring the channel based at least in part on the determining, and monitor the channel using the second energy detection threshold to determine the availability of the channel for the transmission using the first RAT.

A non-transitory computer-readable medium for wireless communication is described. The non-transitory computer-readable medium may include instructions operable to cause a processor to monitor a channel in a shared radio frequency spectrum using a first energy detection threshold to determine an availability of the channel for a transmission using a first RAT, receive a training field on the channel based at least in part on the monitoring, determine whether the training field is associated with the first RAT or a second RAT, identify a second energy detection threshold for monitoring the channel based at least in part on the determining, and monitor the channel using the second energy detection threshold to determine the availability of the channel for the transmission using the first RAT.

Some examples of the method, apparatus, and non-transitory computer-readable medium described above may further include processes, features, means, or instructions for determining that a probability of detecting training fields associated with the first RAT may be above a threshold based at least in part on a number of previously received training fields associated with the first RAT and a number of previously received training fields associated with the second RAT and selecting an energy detection threshold associated with the first RAT as the second energy detection threshold for the monitoring. Some examples of the method, apparatus, and non-transitory computer-readable medium described above may further include processes, features, means, or instructions for determining that a probability of detecting training fields associated with the second RAT may be above a threshold based at least in part on a number of previously received training fields associated with the first RAT and a number of previously received training fields associated with the second RAT and selecting an energy detection threshold associated with the second RAT as the second energy detection threshold for the monitoring.

Some examples of the method, apparatus, and non-transitory computer-readable medium described above may further include processes, features, means, or instructions for detecting a threshold number of training fields associated with the second RAT on the channel and selecting a common energy detection threshold associated with the first RAT and the second RAT based on the detecting the threshold number of training fields associated with the second RAT. In some aspects of the method, apparatus, and non-transitory computer-readable medium described above, monitoring the channel using the second energy detection threshold includes monitoring the channel using the common energy detection threshold for a predefined time period.

In some aspects of the method, apparatus, and non-transitory computer-readable medium described above, determining that the training field may be associated with the first RAT or the second RAT includes failing to detect a second field associated with transmissions using the first RAT or the second RAT and determining that the training field may be associated with the first RAT or the second RAT based at least in part on failing to detect the second field. In some aspects of the method, apparatus, and non-transitory computer-readable medium described above, the second field includes an LTF or an L-SIG field. In some aspects of the method, apparatus, and non-transitory computer-readable medium described above, the second field includes a DCI field.

DETAILED DESCRIPTION

Figure 1:
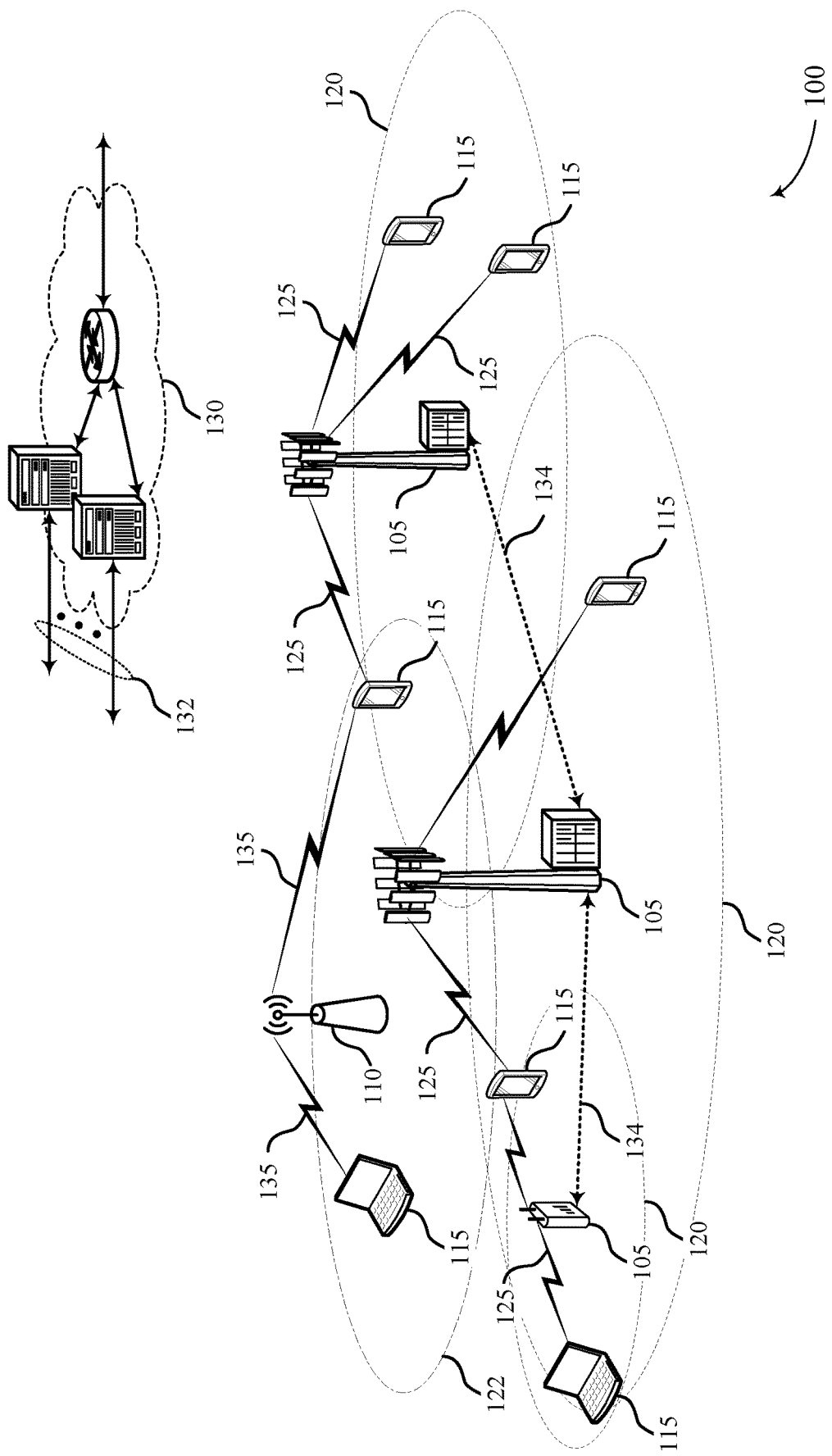
FIGS. 1 and 2 illustrate examples of wireless communications systems that support training field assisted medium sensing across multiple radio access technologies (RATs) in accordance with aspects of the present disclosure.

In some wireless communications systems, wireless devices associated with different wireless networks (e.g., New Radio (NR) networks and Wireless Local Area Networks (WLANs)) may communicate using different radio access technologies (RATs) over a shared radio frequency spectrum. The shared radio frequency spectrum may be a spectrum that is unlicensed, licensed to multiple operators, or licensed to a single operator with opportunistic access by other devices. Prior to communicating on a channel in the shared radio frequency spectrum, wireless devices may transmit channel reservation signals on the channel to reserve the channel for a certain time period. For example, a first wireless device may transmit channel reservation signals using a first RAT to reserve the channel for a certain time period, and a second wireless device may transmit channel reservation signals using a second RAT to reserve the channel for a certain time period.

In some cases, however, the first wireless device configured to communicate using the first RAT may not be able to identify channel reservation signals transmitted by a second wireless device using a second RAT on a channel in a shared radio frequency spectrum. Specifically, the first wireless device may not be able to identify the channel reservation signals transmitted by the second wireless device using a numerology associated with the second RAT. Thus, if an energy level of transmissions to or from the second wireless device on the channel falls below an energy detection threshold used by the first wireless device to monitor the channel, the first wireless device may not be able to detect that the channel is being used by the second wireless device. As a result, in some instances, the first wireless device may determine that a channel in the shared radio frequency spectrum is available when the channel is being used by the second wireless device, and transmissions from both wireless devices may collide, resulting in packet loss and reduced throughput.

Accordingly, in some wireless communications systems, wireless devices configured to communicate using a first RAT may resample to a sampling rate associated with a numerology of a second RAT to decode channel reservation signals transmitted by wireless devices using the second RAT. Alternatively, wireless devices configured to communicate using a first RAT may resample to a sampling rate associated with a numerology of a second RAT to transmit channel reservation signals using the numerology of the second RAT such that wireless devices configured to communicate using the second RAT may decode these signals. However, both these techniques may include resampling to a different sampling rate for receiving or transmitting channel reservation signals, and such resampling techniques may be complex and may cause inefficiencies in a wireless communications system (e.g., due to increased processing times).

As described herein, a wireless communications system may support efficient techniques for allowing wireless devices configured to communicate using one RAT to identify channel reservation signals transmitted by wireless devices configured to communicate using another RAT. In particular, a wireless device configured to communicate using one RAT (e.g., NR) may be configured to transmit channel reservation signals (e.g., a training field) using a first numerology on a channel in a shared radio frequency spectrum, where the channel reservation signals have an autocorrelation property associated with channel reservation signals transmitted using a second numerology of another RAT. Because the autocorrelation property of the channel reservation signals transmitted using the first numerology may be associated with channel reservation signals transmitted using the second numerology, wireless devices configured to communicate using the other RAT may be able to identify the channel reservation signals (e.g., based on the autocorrelation property). The wireless devices may then use additional techniques described herein to perform a channel access procedure based on the decoded channel reservation signals.

Aspects of the disclosure introduced above are described below in the context of a wireless communications system. Examples of processes and signaling exchanges that support training field assisted medium sensing across multiple RATs are then described. Aspects of the disclosure are further illustrated by and described with reference to apparatus diagrams, system diagrams, and flowcharts that relate to training field assisted medium sensing across multiple RATs.

FIG. 1 illustrates an example of a wireless communications system 100 that supports training field assisted medium sensing across multiple RATs in accordance with various aspects of the present disclosure. The wireless communications system 100 includes base stations 105, an access point 110, UEs 115, and a core network 130. In some aspects, the wireless communications system 100 may be a Long Term Evolution (LTE) network, an LTE-Advanced (LTE-A) network, or a NR network. In other examples, the wireless communications system 100 may include multiple networks such as an NR network and a wireless local area network (WLAN). In some cases, wireless communications system 100 may support enhanced mobile broadband communications (eMBB), ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may provide communication coverage for a respective geographic coverage area 120. Communication links 125 shown in wireless communications system 100 may include uplink transmissions from a UE 115 to a base station 105, or downlink transmissions from a base station 105 to a UE 115. Control information and data may be multiplexed on an uplink channel or a downlink channel according to various techniques. Control information and data may be multiplexed on a downlink channel, for example, using time division multiplexing (TDM) techniques, frequency division multiplexing (FDM) techniques, or hybrid TDM-FDM techniques. In some aspects, the control information transmitted during a transmission time interval (TTI) of a downlink channel may be distributed between different control regions in a cascaded manner (e.g., between a common control region and one or more UE-specific control regions).

The geographic coverage area 120 for a base station 105 may be divided into sectors making up only a portion of the geographic coverage area 120, and each sector may be associated with a cell. For example, each base station 105 may provide communication coverage for a macro cell, a small cell, a hot spot, or other types of cells, or various combinations thereof. In some aspects, a base station 105 may be movable and therefore provide communication coverage for a moving geographic coverage area 120. In some aspects, different geographic coverage areas 120 associated with different technologies may overlap, and overlapping geographic coverage areas 120 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 120.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some aspects, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 120 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some aspects, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

The access point 110 may provide wireless communications via a WLAN radio access network (RAN) such as, e.g., a network implementing at least one of the IEEE 802.11 family of standards. The access point 110 may provide, for example, WLAN or other short range (e.g., Bluetooth and Zigbee) communications access to a UE 115. Each access point 110 has a geographic coverage area 120 such that UEs 115 within that area can typically communicate with the access point 110. UEs 115 may be multi-access mobile devices that communicate with the access point 110 and a base station 105 via different RANs. While only one access point 110 is illustrated, the wireless communications system 100 may include multiple access points 110. Some or all of the UEs 115 may associate and communicate with an access point 110 via a communication link 135 and/or with a base station 105 via a communication link 125.

Base stations 105 may communicate with the core network 130 and with one another. For example, base stations 105 may interface with the core network 130 through backhaul links 132 (e.g., via an S1 or another interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some cases, the numerology employed within a system (i.e., subcarrier spacing, symbol-period duration, and/or TTI duration) may be selected or determined based on a type of communication. For example, the numerology may be selected or determined in view of an inherent tradeoff between latency for low latency applications and efficiency for other applications. The subcarrier spacing may be the reciprocal of the symbol-period duration. Thus, because the symbol-period duration may be an integer multiple of the sampling period, the subcarrier spacing may be related to a sampling rate used for sampling in a symbol-period. In some cases, a resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be. Resource blocks may be defined according to other numerologies in various examples.

In some cases, UEs 115 and base stations 105 may support retransmissions of data to increase the likelihood that data is received successfully. Hybrid automatic repeat request (HARQ) feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may utilize both licensed and unlicensed radio frequency spectrum bands. For example, wireless communications system 100 may support NR-Unlicensed (NR-U) or NR shared spectrum (NR-SS) technologies to facilitate communications between NR devices in a shared radio frequency (or unlicensed) spectrum. NR-SS techniques may increase spectrum utilization and spectral efficiency, specifically through dynamic vertical (e.g., across frequency) and horizontal (e.g., across time) sharing of resources. When operating in unlicensed or shared radio frequency spectrum bands, NR devices such as base stations 105 and UEs 115 may employ listen-before-talk (LBT) procedures to ensure a frequency channel is clear before transmitting on the channel. Similarly, devices operating in a WLAN (e.g., Wireless Fidelity (Wi-Fi) devices) may employ LBT procedures to ensure a frequency channel is clear before transmitting on the channel. LBT procedures may include monitoring the energy level of a channel in a shared radio frequency spectrum to determine if the channel is being used for communications by other devices.

In addition to LBT procedures, wireless devices operating in a shared radio frequency spectrum may employ signaling based channel reservation techniques to reserve a channel for a particular time period. In particular, prior to communicating on a channel in a shared radio frequency spectrum, a wireless device configured to communicate using a particular RAT (e.g., NR or Wi-Fi) may transmit one or more training fields in a preamble of a transmission to allow a receiving device configured to communicate using the same RAT to identify the start of a data transmission and synchronize timers to receive the transmission.

Further, the wireless device configured to communicate using the particular RAT may transmit an additional field in the preamble that indicates a duration of the data transmission (e.g., a network allocation vector (NAV)) to allow other wireless devices configured to communicate using a same RAT to avoid communicating on the channel for the duration of the data transmission. The additional field transmitted in the preamble may be a legacy signal (L-SIG) field transmitted by a Wi-Fi device or a downlink control information (DCI) field transmitted by an NR base station 105. The NR base station 105 may transmit the DCI field (e.g., rather than an L-SIG field) to schedule communications on the channel with one or more NR UEs in addition to indicating the duration of the data transmission.

Although devices configured to communicate using a particular RAT may be able to identify signals transmitted using a numerology associated with that RAT, these devices may not be able to identify signals transmitting using a different numerology associated with a different RAT. For example, NR devices may not be able to identify a training field transmitted by Wi-Fi devices, and Wi-Fi devices may not be able to identify a training field transmitted by NR devices. As a result, a wireless device configured to communicate using a particular RAT may erroneously determine that a channel in a shared radio frequency spectrum is available when the channel is being used by another wireless device configured to communicate using a different RAT. For example, if an energy level of transmissions to or from the other wireless device on the channel falls below an energy detection threshold used by the wireless device to monitor the channel, the wireless device may not be able to detect that the channel is being used by the other wireless device. In such cases, transmissions from wireless devices configured to communicate using one RAT may collide with transmissions from wireless devices configured to communicate using another RAT, which may result in packet loss and reduced throughput in a wireless communications system.

To prevent packet loss due to collisions between transmissions from wireless devices configured to communicate using different RATs, a wireless device configured to communicate using a first RAT may resample to a sampling rate associated with a numerology of a second RAT to decode channel reservation signals transmitted by wireless devices using the second RAT (e.g., signaling used to identify a NAV). However, such resampling techniques may be complex and may cause inefficiencies in a wireless communications system (e.g., due to increased processing times). Further, the hardware at a wireless device may have to be altered to allow the wireless device to support such resampling techniques, which may not be possible. Wireless communications system 100 may support efficient techniques for allowing wireless devices configured to communicate using one RAT to identify channel reservation signals transmitted by wireless devices using another RAT.

Figure 2:
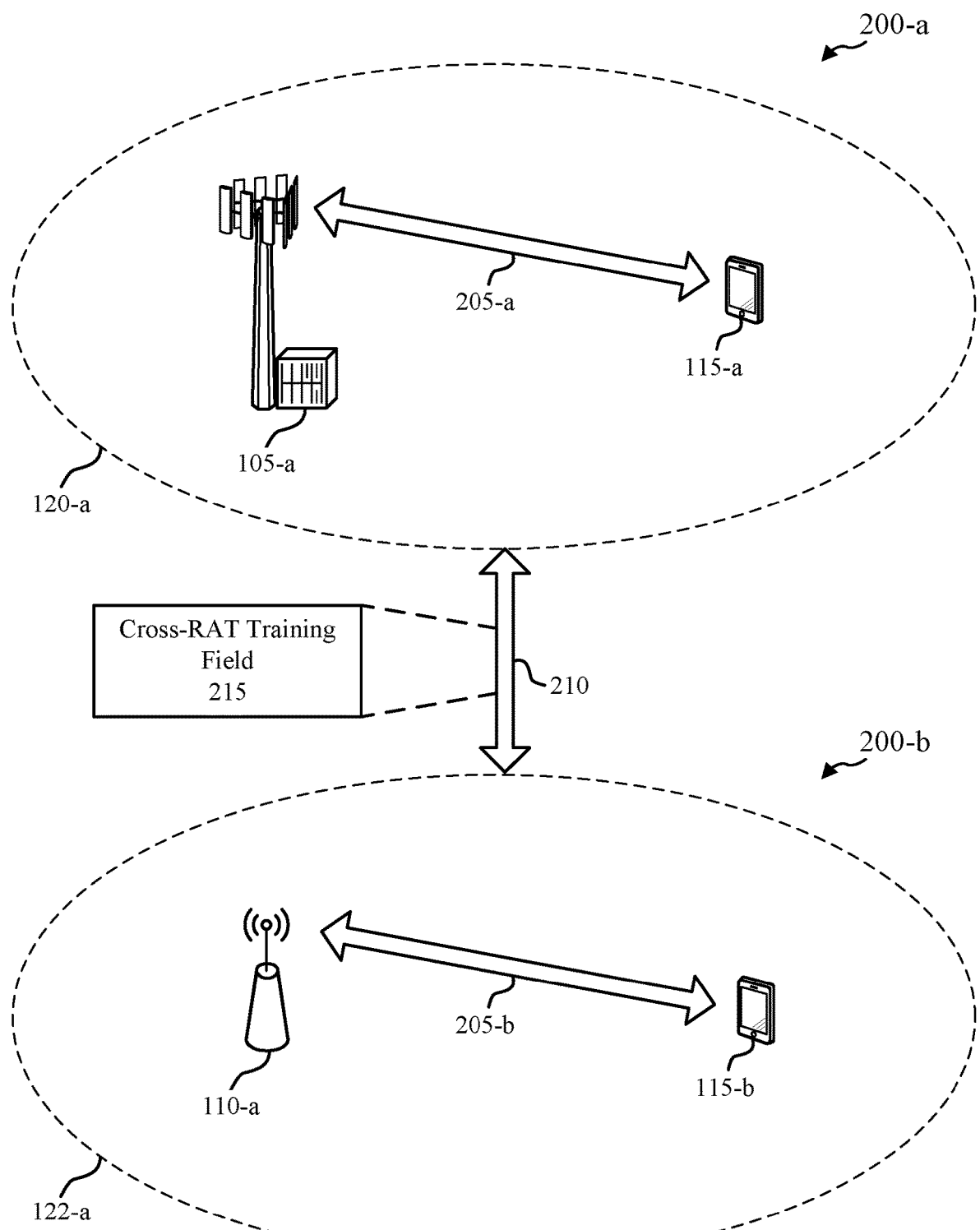

FIG. 2 illustrates an example of wireless networks 200 that support training field assisted medium sensing across multiple RATs in accordance with various aspects of the present disclosure. Wireless network 200-a includes base station 105-a and UE 115-a, which may be examples of the corresponding devices described with reference to FIG. 1. Base station 105-a may communicate with UEs 115 (including UE 115-a) within coverage area 120-a. For example, base station 105-a may communicate with UE 115-a on resources of a carrier 205-a. Wireless network 200-b may include access point 110-a and UE 115-b which may be examples of the corresponding devices described with reference to FIG. 1. Access point 110-a may communicate with UEs 115 (including UE 115-b) (e.g., also referred to as stations) within coverage area 122-a, which may overlap with coverage area 120-a. For example, access point 110-a may communicate with UE 115-b on resources of a carrier 205-b. Wireless network 200-a may be an example of an NR network, and wireless network 200-b may be an example of a WLAN.

As described herein, wireless devices in wireless networks 200-a and 200-b may support efficient techniques for generating channel reservation signals to transmit in a preamble of a transmission to reserve a channel in a shared radio frequency spectrum for the transmission. In particular, as mentioned with reference to FIG. 1, wireless devices in wireless network 200-a may support efficient techniques for transmitting cross-RAT training fields in a preamble of a transmission such that wireless devices in wireless network 200-b may be able to identify the cross-RAT training fields. Further, wireless devices in wireless network 200-a may support efficient techniques for detecting training fields transmitted by wireless devices in wireless network 200-b (i.e., cross-RAT training fields from the perspective of wireless devices in wireless network 200-a). The cross-RAT training fields may correspond to training fields transmitted using one numerology associated with a RAT that can be identified by wireless devices configured to communicate using another numerology of a different RAT.

In the example of FIG. 2, prior to transmitting data on a channel in a shared radio frequency spectrum, a wireless device in wireless network 200-a (e.g., base station 105-a or UE 115-a) may transmit a cross-RAT training field 215 on the channel. The cross-RAT training field may be transmitted on a shared radio frequency spectrum carrier 210 that may be monitored by wireless devices in wireless network 200-a and wireless devices in wireless network 200-b. The shared radio frequency spectrum carrier 210 may be different from the network carrier 205-a associated with wireless network 200-a and may be the same as or different from the network carrier 205-b used in wireless network 200-b. The cross-RAT training field 215 may be generated for transmission using a numerology used for communications in wireless network 200-a, and the cross-RAT training field 215 may have an autocorrelation property associated with training fields transmitted using a numerology used for communications in wireless network 200-b. For example, the autocorrelation property of the cross-RAT training field 215 may be associated with a set of subcarriers or a repetition period of training fields transmitted using a numerology used for communications in wireless network 200-b. Because the cross-RAT training field 215 is transmitted using the numerology used for communications in wireless network 200-a, the cross-RAT training field 215 may be identified by wireless devices in wireless network 200-a. Further, because the autocorrelation property of the cross-RAT training field 215 is associated with training fields transmitted using a numerology used for communications in wireless network 200-b, the cross-RAT training field 215 may be identified by wireless devices in wireless network 200-b (e.g., based on the auto correlation property).

In one aspect, the numerology associated with wireless network 200-a may include a first sampling rate of 61.44 MHz (e.g., 30 kHz subcarrier spacing×2048 subcarriers). The numerology associated with wireless network 200-a may also support additional subcarrier spacings (e.g., 60 kHz, 120 kHz, 240 kHz) and bandwidths. However, the numerology of wireless network 200-b may include a subcarrier spacing that is different (e.g., not an integer multiple of the subcarrier spacing employed in wireless network 200-a) and a symbol duration that is not an integer multiple of the first sampling period (e.g., the inverse of the first sampling rate). For example, wireless network 200-b may use a subcarrier spacing of 312.5 kHz, which is not an integer multiple of 30 kHz. A training field associated with wireless network 200-b may include symbols transmitted on 13 subcarriers of 52 subcarriers within a frequency channel (e.g., where one of the 13 subcarriers is a zero-frequency (e.g., direct current (DC)) subcarrier, and the other subcarriers are four subcarriers apart) and may use a 0.8 µs symbol duration repeated 10 times for a training field duration of 8 µs. Thus, the training field may have a subcarrier spacing for tones of the training field of 1.25 MHz, with three null tones in between each of the tones used for the training field.

Figure 3:
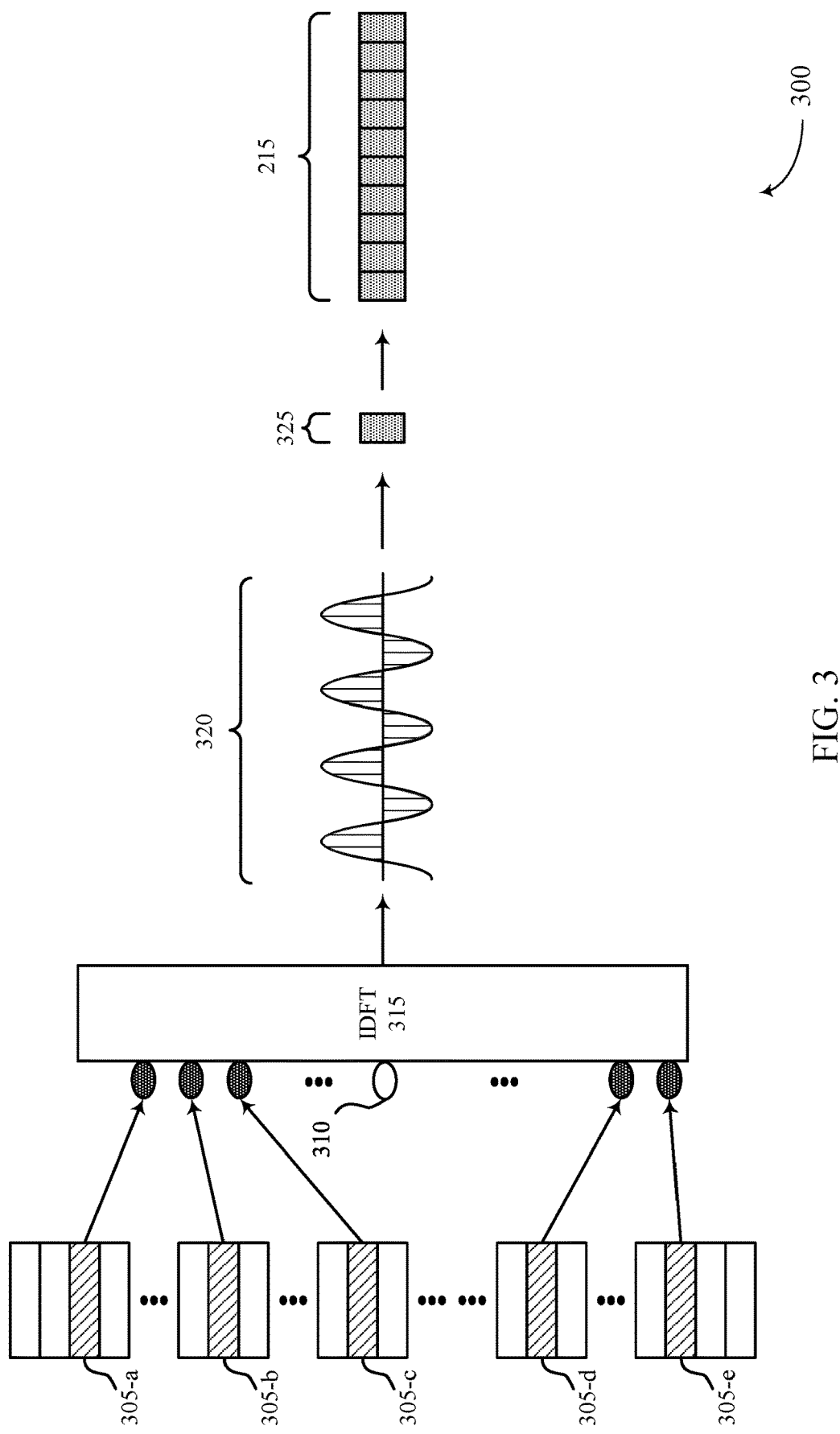
FIG. 3 illustrates an example procedure for generating a cross-RAT training field in accordance with aspects of the present disclosure.

FIG. 3 illustrates an example procedure 300 for generating a cross-RAT training field 215 in accordance with aspects of the present disclosure. In the example of FIG. 3, a wireless device in wireless network 200-a may identify a set of tones used for the training field (e.g., 13 tones, including, for example, tones 305-a, 305-b, 305-c, 305-d, and 305-e). Tones used in generating the training field may be separated by 40 null tones (e.g., 40 null tones may separate tone 305-a and 305-b, and so on). The tones may map to a total of 13 subcarriers (e.g., 12 subcarriers and a DC subcarrier 310), with a subcarrier spacing of 1.23 MHz (e.g., 30 kHz subcarrier spacing×41 subcarriers) on which to transmit the cross-RAT training field 215. Alternatively, the subcarrier spacing may be selected as 1.26 MHz (e.g., 30 kHz subcarrier spacing×42 subcarriers). Thus, the cross-RAT training field 330 may be transmitted on a number of subcarriers (e.g., 13) that is close to or the same as the number of subcarriers (e.g., 13) used to transmit training fields in wireless network 200-b, and a number of null subcarriers between the subcarriers carrying symbols of the cross-RAT training field 215 (e.g., 40) may be different from a number of null subcarriers between the subcarriers of training fields in wireless network 200-b (e.g., 3).

The spacing between subcarriers used for the cross-RAT training field 215 may be close to the subcarrier spacing used for training fields generated by wireless devices in wireless network 200-b (e.g., selected to be a closest subcarrier spacing to the training fields for wireless network 200-b using an integer number of subcarriers at the numerology of the wireless network 200-a), while the bandwidths spanned by the training fields in both networks may also be approximately the same. In some aspects, the number of null subcarriers between the subcarriers carrying symbols of the cross-RAT training field 215 may vary such that the offset of each of the subcarriers carrying symbols of the cross-RAT training field from the DC subcarrier 310 is as close as possible to the offset for each of the subcarriers carrying symbols of the training field in wireless network 200-b. For example, the first three subcarriers carrying symbols of the training field in wireless network 200-b may have offsets of 1250 kHz, 2500 kHz, and 3750 kHz and the first three subcarriers carrying symbols of the cross-RAT training field may have offsets of 1230 kHz (41 subcarrier offset), 2490 kHz (83 subcarrier offset), and 3750 kHz (125 subcarrier offset).

Once the symbols are mapped to the appropriate subcarriers, the wireless device in wireless network 200-a may generate a signal 320 for a cross-RAT preamble at a first sample rate (e.g., used in wireless network 200-a) based on a preamble sequence (e.g., via an inverse discrete Fourier transform (IDFT) 315 or inverse fast Fourier transform (IFFT) of preamble symbols). The wireless device may then use the first 49 samples of the signal 320 to generate a signal block 325 with a time domain length of 0.797 µs which may be close to the 0.8 µs time domain length of a similar signal generated in wireless network 200-b. The generated signal block 325 with the time domain length of 0.797 µs may then be repeated 10 times to generate the cross-RAT training field 215 with a duration of 7.97 µs. This number of repetitions may be the same as the number of repetitions used to generate training fields with a duration of 8 µs in wireless network 200-b.

While monitoring the channel as part of a channel access procedure, a wireless device in wireless network 200-b may detect the cross-RAT training field 215 based on the autocorrelation property. For instance, a wireless device in wireless network 200-b may perform an autocorrelation using a 0.8 µs symbol duration and sample rate associated with wireless network 200-b and may detect an autocorrelation peak upon receiving the cross-RAT training field transmitted by a wireless device in wireless network 200-a.

Although the techniques described above are directed to a cross-RAT training field transmitted by wireless devices in wireless network 200-a, a cross-RAT training field may also refer to a training field transmitted by wireless devices in wireless network 200-b (e.g., a short training field (STF)), when identified by a wireless device associated with wireless network 200-a. In some cases, to limit the changes to wireless devices operating in wireless network 200-b (e.g., Wi-Fi devices), the training field transmitted by these wireless devices may be generated using conventional techniques. In such cases, wireless devices in wireless network 200-a may identify the cross-RAT training field 215 transmitted by wireless devices in wireless network 200-b based on the autocorrelation property of the cross-RAT training field 215. For instance, a wireless device in wireless network 200-a may perform an autocorrelation using a 0.797 µs symbol duration and sample rate associated with wireless network 200-a and may detect an autocorrelation peak upon receiving the cross-RAT training field transmitted by a wireless device in wireless network 200-b.

Figure 4:
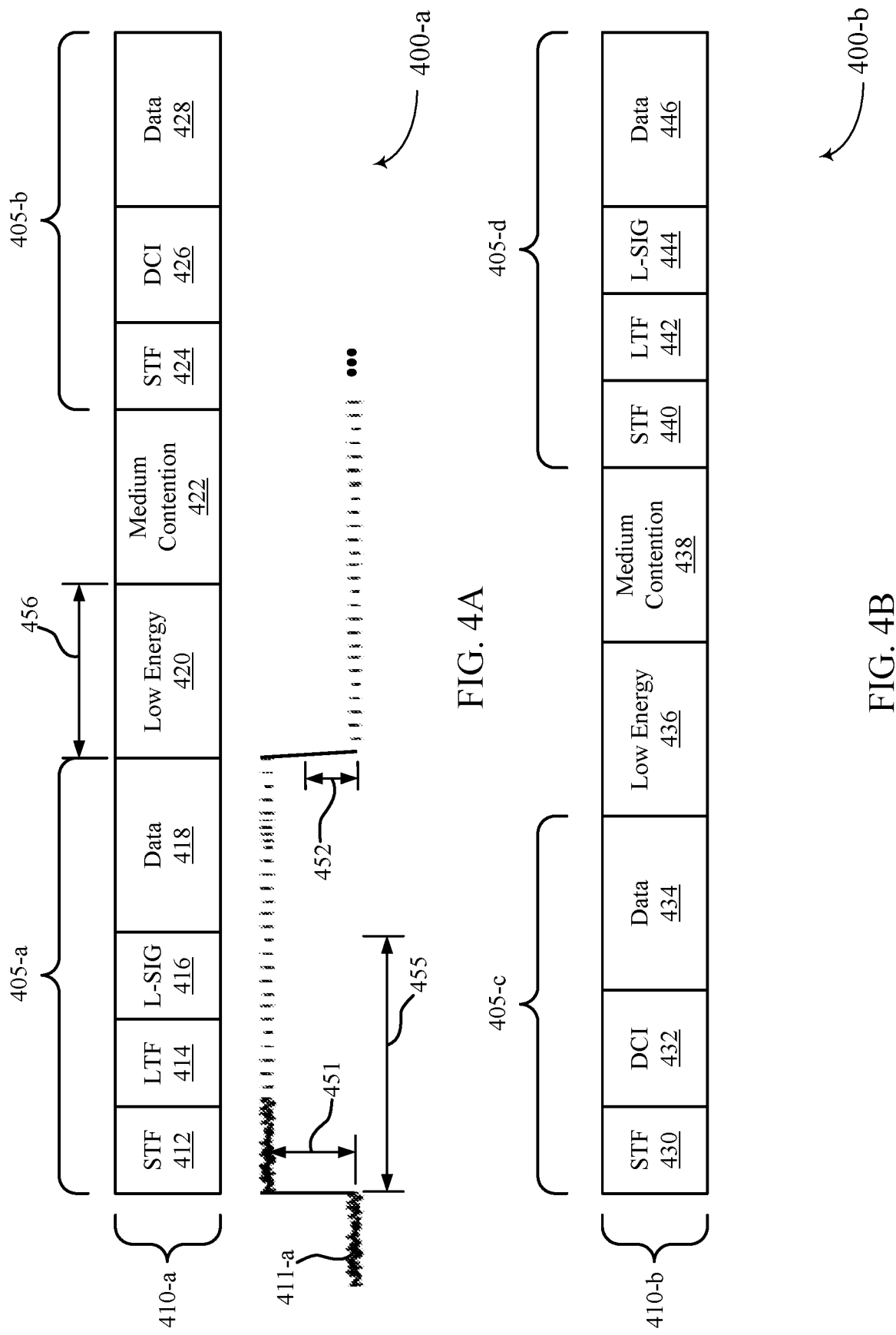
FIGS. 4A-4B and 5A-5B illustrate example timelines of medium sensing techniques used in a channel access procedure in accordance with aspects of the present disclosure.

FIGS. 4A and 4B illustrate example timelines 400 of transmissions in a shared radio frequency spectrum in accordance with aspects of the present disclosure. In the example of FIG. 4A, a Wi-Fi device may gain access to channel 410-a for a data transmission during a transmission opportunity 405-a. The Wi-Fi device may transmit channel reservation signals on channel 410-a to reserve the channel 410-a for the data transmission. In particular, the Wi-Fi device may transmit an STF 412, a long training field (LTF) 414, and an L-SIG 416. The STF 412, LTF 414, and L-SIG 416 may be transmitted in a preamble of the transmission prior to a data transmission 418 of the transmission opportunity 405-a. In some cases, an NR-SS device may monitor channel 410-a to determine the availability of channel 410-a for NR communications, and the NR-SS device may identify the STF 412 (e.g., based on an autocorrelation property associated with the STF 412 as described with reference to FIGS. 2 and 3). The NR-SS device may identify the STF 412 using its own numerology (e.g., sampling rate used for NR communication).

The NR-SS device may then determine that the STF 412 was transmitted by a Wi-Fi device based on failing to detect a second field (e.g., a DCI field) transmitted by NR-SS devices along with training fields in an NR network. That is, because NR-SS devices may transmit a different field (e.g., the DCI field) along with training fields than Wi-Fi devices (e.g., an L-SIG field), the NR-SS device may be able to determine that the STF 412 was transmitted by a Wi-Fi device based on failing to detect the second field. The NR-SS device may not be able to determine a duration of the transmission opportunity 405-a based on the L-SIG 416. That is, because the preamble of the transmission was transmitted using a Wi-Fi numerology and the NR-SS device may detect the preamble using a different numerology, the NR-SS device may identify an approximation of the signals in the preamble (e.g., rather than the exact signals). This approximation may be sufficient to identify the STF 412, but the approximation may not be sufficient to determine the duration of the transmission opportunity 405-*a* based on the L-SIG 416. Thus, instead of determining the duration of the transmission opportunity 405-*a* based on the L-SIG 416, the NR-SS device may utilize the transmission opportunity edge detection techniques described herein to determine the duration (or end) of the transmission opportunity 405-*a*.

An example detected signal energy 411-*a* for channel 410-*a* is shown in FIG. 4A. The NR-SS device may determine a reference energy level 451 of the signals received on the channel based on the STF 412. In some cases, the NR-SS device may determine the reference energy level of the signals based on the energy level of the STF 412, LTF 414, and L-SIG 416 since these fields may be transmitted with a fixed duration (e.g., 20 ms total). Alternatively, NR-SS devices and Wi-Fi devices may be configured to determine the reference energy level of cross-RAT channel reservation signals based on a common duration 455 (e.g., a duration of a Wi-Fi preamble including STF, LTF, and L-SIG fields or a duration of an NR-SS preamble including STF and DCI fields). Once the NR-SS device determines the reference energy level 451, the NR-SS device may determine if the reference energy level is below an edge detection threshold (e.g., within a threshold of a noise floor). If the reference energy is below the edge detection threshold, the NR-SS device may resume a channel access procedure to gain access to channel 410-*a*. In this instance, because the reference energy level is too low to perform accurate edge detection, any interference from transmissions in the transmission opportunity 405-*a* is likely to be minimal. Otherwise, the NR-SS device may monitor the energy level 411-*a* of channel 410-*a* relative to the reference energy level. When the NR-SS device determines that the energy level of the channel falls below a threshold 452 (e.g., a fraction of the reference energy level 451) shown by low energy period 420 for a predefined time period 456 (e.g., a predefined number of slots), the NR-SS device may determine that the transmission opportunity 405-*a* has ended.

The predefined time period 456 discussed above (e.g., the predefined number of slots) may be used to prevent the NR-SS device from erroneously determining that a transmission opportunity has ended. For example, if Wi-Fi devices communicating on channel 410-*a* in a transmission opportunity employ a request to send (RTS)/clear to send (CTS) mechanism prior to communicating on channel 410-*a*, the energy level of the channel may be below a threshold of the reference energy level during the RTS/CTS turnaround time. However, during this time, the transmission opportunity may be ongoing. Similarly, if a time period allocated for a data transmission facilitates the transmission of feedback, the energy level of the channel may be below the threshold 452 of the reference energy level when the receiving device is processing data for generating the feedback. However, during this time, the transmission opportunity may similarly be ongoing. Thus, the predefined time period may accommodate for time periods within a transmission opportunity where the energy level of the channel may be below the threshold 452 of the reference energy level 451 such that an NR-SS device may avoid erroneously determining that a transmission opportunity has ended.

Once the NR-SS device determines that the transmission opportunity 405-*a* has ended (e.g., low energy period 420), the NR-SS device may resume a channel access procedure (e.g., in medium contention period 422) to gain access to channel 410-*a* for data transmission. The channel access procedure may include initiating or resuming a countdown during which the NR-SS device may monitor channel 410-*a* for another STF from another wireless device. If the countdown expires and the NR-SS device fails to receive another STF (or other signal energy exceeding an energy detection threshold), the NR-SS device may access the channel 410-*a* for a transmission opportunity 405-*b*. The NR-SS device may then transmit channel reservation signals on channel 410-*a* to reserve the channel 410-*a* for a data transmission 428. In particular, the NR-SS device may transmit an STF 424 and DCI 426 prior to data transmission 428. The STF 424 and DCI 426 may be transmitted in a preamble of a transmission in the transmission opportunity 405-*b*, followed by the data transmission 428 of the transmission opportunity 405-*b*.

In the example of FIG. 4B, an NR-SS device may gain access to channel 410-*b* for a data transmission during a transmission opportunity 405-*c*. The Wi-Fi device may transmit channel reservation signals on channel 410-*b* to reserve the channel 410-*b* for the data transmission. In particular, the NR device may transmit an STF 430 and DCI 432. The STF 430 and DCI 432 may be transmitted in a preamble of the transmission prior to a data transmission 434 of the transmission opportunity 405-*c*. In some cases, a Wi-Fi device may monitor channel 410-*b* to determine the availability of channel 410-*b* for Wi-Fi communications, and the Wi-Fi device may identify the STF 430 (e.g., based on an autocorrelation property associated with the STF 430 as described with reference to FIGS. 2 and 3).

The Wi-Fi device may then determine that the STF 430 was transmitted by an NR-SS device based on failing to detect a second field (e.g., an LTF field or an L-SIG field) transmitted by Wi-Fi devices along with training fields in a Wi-Fi network. That is, because Wi-Fi devices may transmit different fields (e.g., the LTF field or the L-SIG field) along with training fields than NR-SS devices (e.g., a DCI field), the Wi-Fi device may be able to determine that the STF 430 was transmitted by an NR-SS device based on failing to detect the second field. However, the Wi-Fi device may not be able to determine a duration of the transmission opportunity 405-*a* based on the DCI 432. That is, the Wi-Fi device may be able to identify the STF 430 transmitted using an NR-SS numerology based on an approximation of an autocorrelation property associated with a Wi-Fi STF. However, the Wi-Fi device may not be able to decode the DCI 432. Thus, instead of determining the duration of the transmission opportunity 405-*c* based on information in the DCI 432, the Wi-Fi device may utilize the energy detection techniques described herein to determine the duration (or end) of the transmission opportunity 405-*c*.

The Wi-Fi device may determine a reference energy level of the signals received on the channel based on the STF 430. In some cases, the Wi-Fi device may determine the reference energy level of the signals based on the energy level of the STF and the DCI since these fields may be transmitted with a fixed duration. Alternatively, Wi-Fi devices and NR-SS devices may be configured to determine the reference energy level of cross-RAT channel reservation signals based on a common duration (e.g., a duration of a Wi-Fi preamble including STF, LTF, and L-SIG fields or a duration of an NR-SS preamble including STF and DCI fields). Once the Wi-Fi device determines the reference energy level, the Wi-Fi device may determine if the reference energy level is below an edge detection threshold (e.g., within a threshold of a noise floor). If the reference energy is below the edge detection threshold, the Wi-Fi device may resume a channel access procedure to gain access to channel 410-*b* since any interference from transmissions in the transmission opportunity 405-*c* is likely to be minimal. Otherwise, the Wi-Fi device may pause the channel access procedure and monitor the energy level of channel 410-*b* relative to the reference energy level. When the Wi-Fi device determines that the energy level of the channel falls below a fraction of the reference energy level (e.g., shown in low energy period 436) for a predefined time period (e.g., a predefined number of slots), the Wi-Fi device may determine that the transmission opportunity 405-*c* has ended.

The predefined time period discussed above (e.g., the predefined number of slots) may be used to prevent the Wi-Fi device from erroneously determining that a transmission opportunity has ended. For example, if NR-SS devices communicating on channel 410-*b* in a transmission opportunity employ an RTS/CTS mechanism prior to communicating on channel 410-*b*, the energy level of the channel may be below a threshold of the reference energy level during the RTS/CTS turn-around time. However, during this time, the transmission opportunity may be ongoing. Similarly, if a time period allocated for a data transmission facilitates the transmission of HARQ feedback, the energy level of the channel may be below a threshold of the reference energy level when the receiving device is processing data for generating the HARQ feedback. However, during this time, the transmission opportunity may similarly be ongoing. Thus, the predefined time period may accommodate for time periods within a transmission opportunity where the energy level of the channel may be below a threshold of the reference energy level such that a Wi-Fi device may avoid erroneously determining that a transmission opportunity has ended.

Once the Wi-Fi device determines that the transmission opportunity 405-*c* has ended (e.g., by detecting low energy period 436), the NR-SS device may initiate or resume a channel access procedure (e.g., in medium contention period 438) to gain access to channel 410-*b* for a data transmission. The channel access procedure may include initiating a countdown during which the Wi-Fi device may monitor channel 410-*b* for another STF from another wireless device (or another signal energy exceeding an energy detection threshold). If the countdown expires and the Wi-Fi device fails to receive another STF, the Wi-Fi device may access the channel 410-*b* for a transmission opportunity 405-*d*. The Wi-Fi device may then transmit channel reservation signals on channel 410-*b* to reserve the channel 410-*b* for a data transmission 446. In particular, the Wi-Fi device may transmit an STF 440, an LTF 442, and an L-SIG 444. The STF 440, LTF 442, and L-SIG 444 may be transmitted in a preamble for transmission opportunity 405-*d*, and the Wi-Fi device may transmit the data transmission 446 in the transmission opportunity 405-*d*.

Figure 5:
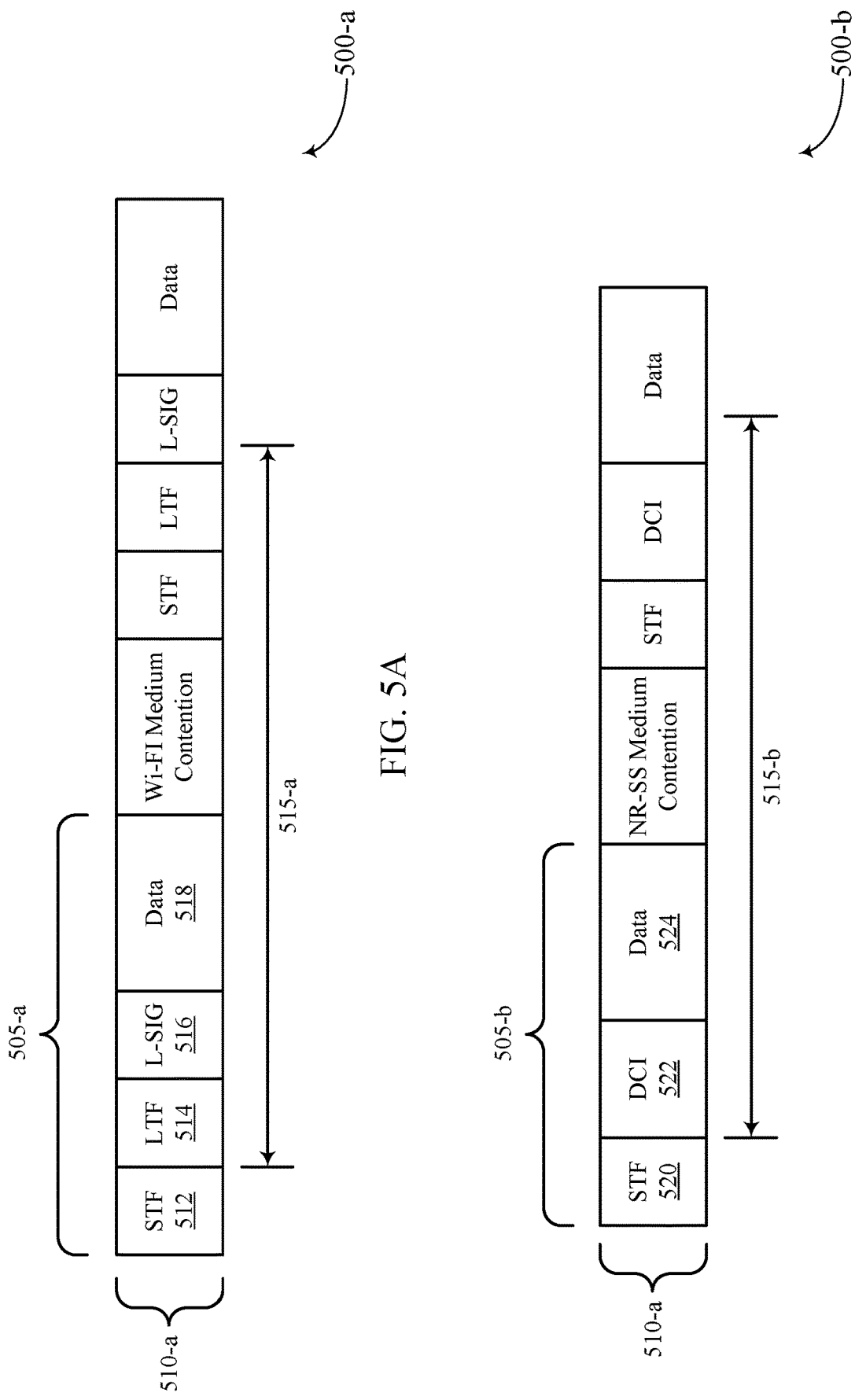

FIGS. 5A and 5B illustrate example timelines 500 of transmissions in a shared radio frequency spectrum in accordance with aspects of the present disclosure. In the example of FIG. 5A, a Wi-Fi device may gain access to channel 510-*a* for a data transmission during a transmission opportunity 505-*a*. The Wi-Fi device may transmit channel reservation signals on channel 510-*a* to reserve the channel 510-*a* for the data transmission. In particular, the Wi-Fi device may transmit an STF 512, an LTF 514, and an L-SIG 516 in a preamble of the transmission prior to a data transmission 518 of the transmission opportunity 505-*a*. In some cases, an NR-SS device may monitor channel 510-*a* to determine the availability of channel 510-*a* for NR communications, and the NR-SS device may identify the STF 512 (e.g., based on an autocorrelation property associated with the STF 512 as described with reference to FIGS. 2 and 3).

The NR-SS device may then determine that the STF 512 was transmitted by a Wi-Fi device based on failing to detect a second field (e.g., a DCI field) transmitted by NR-SS devices along with training fields in an NR network. That is, because NR-SS devices may transmit a different field (e.g., the DCI field along with training fields) than Wi-Fi devices (e.g., an L-SIG field), the NR-SS device may be able to determine that the STF 512 was transmitted by a Wi-Fi device based on failing to detect the second field. Because the NR-SS device may not be able to successfully decode the L-SIG 516 using the NR-SS numerology, the NR-SS device may not be able to determine a duration of the transmission opportunity 505-*a* based on the L-SIG 516. In some aspects, the NR-SS device may avoid communicating on the channel for a fixed duration to avoid interfering with the data transmission in the transmission opportunity 505-*a* based on detection of a cross-RAT STF.

This fixed duration may be referred to as a transmission opportunity backoff time period 515-*a* and may correspond to a maximum transmission opportunity duration used for communications in a shared radio frequency spectrum. The NR-SS device may resume a channel access procedure to access channel 510-*a* after the transmission opportunity backoff time period 515-*a*. In some cases, the NR-SS device may continue monitoring channel 510-*a* during the transmission opportunity backoff time period 515-*a*. Once the NR-SS device receives a threshold number of STFs (e.g., one, two, three, etc.) transmitted by Wi-Fi devices (e.g., where each of the STFs is received within a respective backoff time period of a previous STF), the NR-SS device may initiate or resume a channel access procedure to ensure that the NR-SS device has an opportunity to access the channel. Additionally or alternatively, the NR-SS device may reduce the transmission opportunity backoff time period by a predetermined amount for each STF detected within a previous transmission opportunity backoff time period.

Although the transmission from the NR-SS device may collide with other transmissions on the channel after receiving the threshold number of STFs (because the transmission from the NR-SS device was gated by several Wi-Fi transmissions), the NR-SS device may have effectively self-limited its own access more than necessitated based on the transmission opportunity lengths. The channel access procedure may include initiating or resuming a countdown during which the NR-SS device may allow the countdown for slots for which detected energy is below a threshold and/or no STF is detected. If the countdown expires, the NR-SS device may access channel 510-*a* for a data transmission. The NR-SS device may then transmit channel reservation signals on channel 510-*a* to reserve the channel 510-*a* for the data transmission.

In the example of FIG. 5B, an NR-SS device may gain access to channel 510-*b* for a data transmission during a transmission opportunity 505-*b*. The NR-SS device may transmit channel reservation signals on channel 510-*b* to reserve the channel 510-*b* for the data transmission. In particular, the NR-SS device may transmit an STF 520 and DCI 522 in a preamble of the transmission prior to a data transmission 524 of the transmission opportunity 505-*b*. In some cases, a Wi-Fi device may monitor channel 510-*b* to determine the availability of channel 510-*b* for Wi-Fi communications, and the Wi-Fi device may identify the STF 520

(e.g., based on an autocorrelation property associated with the STF 520 as described with reference to FIGS. 2 and 3).

The Wi-Fi device may then determine that the STF 520 was transmitted by an NR-SS device based on failing to detect a second field (e.g., an LTF or L-SIG field) transmitted by Wi-Fi devices along with training fields in a Wi-Fi network. That is, because Wi-Fi devices may transmit different fields (e.g., the LTF field or the L-SIG field) along with training fields than NR-SS devices (e.g., a DCI field), the Wi-Fi device may be able to determine that the STF 520 was transmitted by an NR-SS device based on failing to detect the second field. However, the Wi-Fi device may not be able to determine a duration of the transmission opportunity 505-*b* based on the DCI 522. That is, the Wi-Fi device may identify the STF 520 based on an approximation of the autocorrelation property in the preamble. This approximation may be sufficient to identify the STF 520, but the Wi-Fi device may not be able to decode the DCI 522. Thus, instead of determining the duration of the transmission opportunity 505-*b* based on information in the DCI 522, the Wi-Fi device may avoid communicating on the channel for a fixed duration to avoid interfering with the data transmission in the transmission opportunity 505-*b*.

This fixed duration may be referred to as a transmission opportunity backoff time period 515-*b* and may correspond to a maximum transmission opportunity duration used for communications in a shared radio frequency spectrum. The Wi-Fi device may resume a channel access procedure to access channel 510-*b* after the transmission opportunity backoff time period 515-*b*. In some cases, the Wi-Fi device may continue monitoring channel 510-*b* during the transmission opportunity backoff time period 515-*b*. Once the Wi-Fi device receives a threshold number of STFs (e.g., one, two, three, etc.) transmitted by NR-SS devices (e.g., where each of the STFs is received within a respective backoff time period of a previous STF), the Wi-Fi device may resume a channel access procedure to ensure that the Wi-Fi device has an opportunity to access the channel. Additionally or alternatively, the Wi-Fi device may reduce the transmission opportunity backoff time period by a predetermined amount for each STF detected within a previous transmission opportunity backoff time period.

Although the transmission from the Wi-Fi device may collide with other transmissions on the channel after receiving the threshold number of STFs, because the transmission from the Wi-Fi device was gated by several NR-SS transmissions, the Wi-Fi device may have effectively self-limited its own access more than necessitated based on the transmission opportunity lengths. The channel access procedure may include initiating or resuming a countdown during which the Wi-Fi device may allow the countdown for slots for which detected energy is below a threshold and/or no STF is detected. If the countdown expires, the Wi-Fi device may access channel 510-*b* for a data transmission. The Wi-Fi device may then transmit channel reservation signals on channel 510-*b* to reserve the channel 510-*b* for the data transmission.

Figure 6:
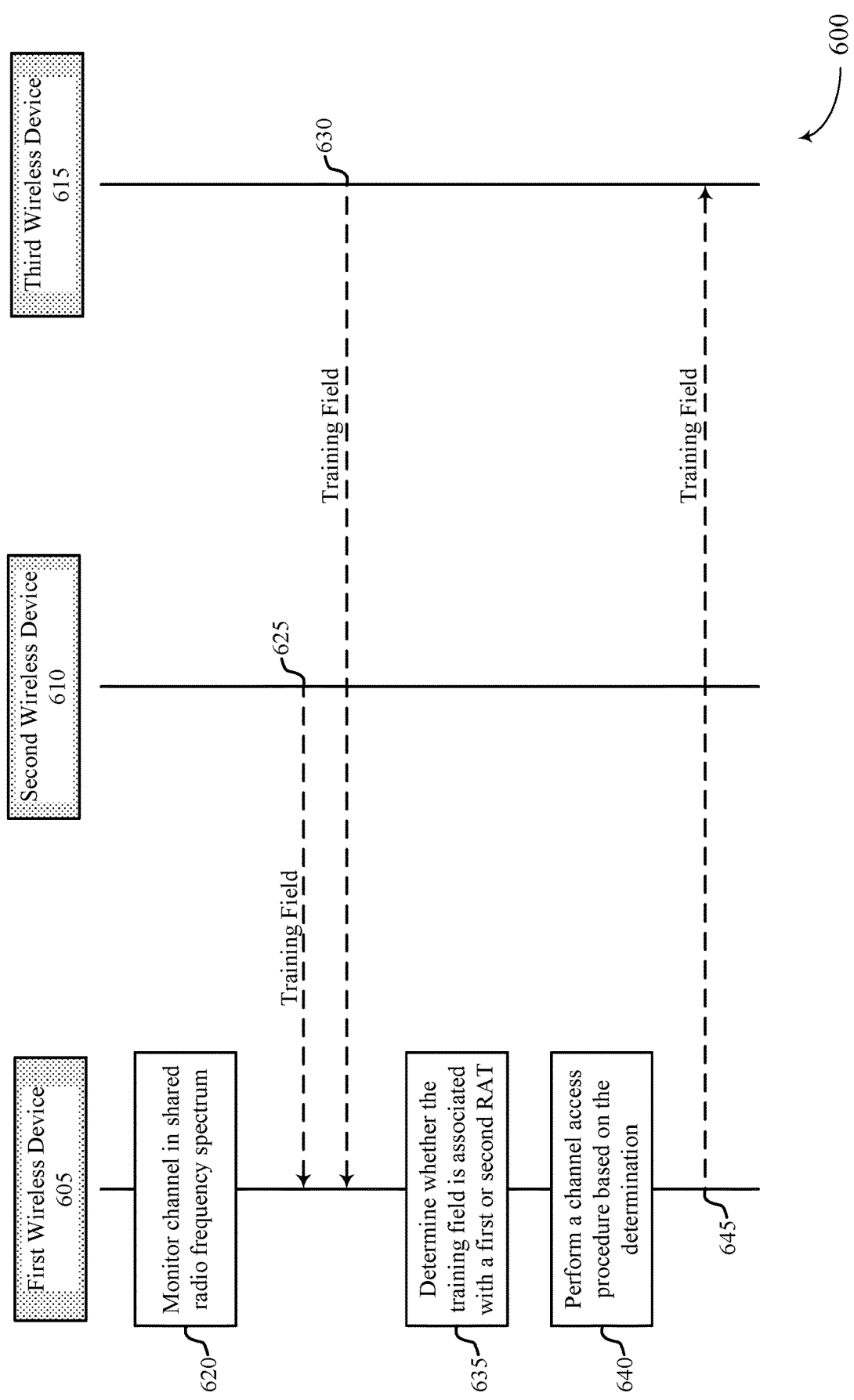
FIG. 6 illustrates an example of a process flow that supports training field assisted medium sensing across multiple RATs in accordance with aspects of the present disclosure.

FIG. 6 illustrates an example of a process flow 600 that supports training field assisted medium sensing across multiple RATs in accordance with various aspects of the present disclosure. Process flow 600 illustrates aspects of techniques performed by multiple wireless devices, which may be examples of wireless devices described with reference to FIGS. 1-5. First wireless device 605 and second wireless device 610 may be configured to communicate using a first RAT, and third wireless device 615 may be configured to communicate using a second RAT. As mentioned above with reference to FIG. 1, wireless devices communicating in a shared radio frequency spectrum may employ LBT procedures to ensure a frequency channel is clear before transmitting on the channel. LBT procedures may include monitoring the energy level of a channel in a shared radio frequency spectrum to determine if the channel is being used for communications by other devices. Specifically, a wireless device may monitor the energy level of a channel, and, if the energy level is above an energy detection threshold, the wireless device may avoid transmitting on the channel (e.g., pause a countdown timer associated with channel access).

In some wireless communications systems, different wireless devices may be configured to communicate using different RATs (e.g., NR and Wi-Fi) in a shared radio frequency spectrum. In some cases, wireless devices configured to communicate using one RAT may be configured to use a first energy detection threshold for performing LBT procedures, and wireless devices configured to communicate using another RAT may be configured to use a second energy detection threshold for performing LBT procedures. For example, Wi-Fi devices may be configured to use a first energy detection threshold (e.g., −62 dBm), and NR-SS devices may be configured to use a second energy detection threshold (e.g., −72 dBm). In such cases, however, the wireless devices configured to use the higher energy detection threshold for performing LBT procedures (e.g., Wi-Fi devices) may be able to access a channel more often than wireless devices configured to use the lower energy detection threshold (e.g., NR-SS devices).

For example, when an energy level of a channel is above the first energy detection threshold but below the second energy detection threshold, wireless device configured to perform LBT procedures using the second energy detection threshold may be able to access the channel while wireless devices configured to perform LBT procedures using the first energy detection threshold may not. As a result, in a dense deployment (e.g., with several devices attempting to access a channel in a shared radio frequency spectrum), wireless devices configured to perform LBT procedures using the lower energy detection threshold may not be able to access the channel.

As described herein, wireless communications systems may support efficient techniques for configuring wireless devices with appropriate energy detection thresholds for performing LBT procedures. In particular, a wireless device may adapt an energy detection threshold used to perform LBT procedures based on the types of wireless devices communicating in a shared radio frequency spectrum. While monitoring a channel using one energy detection threshold, the wireless device (e.g., configured to communicate using a particular RAT) may receive a training field associated with a first RAT or a second RAT. The wireless device may then determine an energy detection threshold (e.g., a same energy detection threshold or a different energy detection threshold) to use for performing LBT procedures based on whether the training field is associated with the first RAT or the second RAT.

In the example of FIG. 6, at 620, first wireless device 605 may monitor a channel in a shared radio frequency spectrum using a first energy detection threshold. While monitoring the channel, the first wireless device 605 may receive a training field from another wireless device, where the training field indicates that the channel is reserved for communications by the other wireless device. In one aspect, at 625, first wireless device 605 may receive the training field from second wireless device 610 configured to communicate using a first RAT, and, in another example, at 630, first wireless device 605 may receive the training field from third wireless device 615 configured to communicate using a second RAT.

At 635, first wireless device 605 may determine whether the received training field is associated with a first RAT (e.g., received from second wireless device 610 at 625) or a second RAT (e.g., received from third wireless device 615 at 630). Since the first wireless device 605 may be configured to communicate using the first RAT, the first wireless device 605 may determine if the received training field is associated with the first RAT based on receiving a second field (e.g., a DCI field) after the received training field, and the first wireless device 605 may determine if the received training field is associated with the second RAT based on failing to receive the second field after the received training field. Once the first wireless device 605 identifies whether the received training field is associated with the first RAT or the second RAT, first wireless device 605 may identify an energy detection threshold to use for performing LBT procedures based on whether the training field is associated with the first RAT or the second RAT.

In one aspect, first wireless device 605 may identify an energy detection threshold to use for performing LBT procedures based on the probability that a training field to be received on the channel is associated with the first RAT or a second RAT. This probability may be determined based on the number of previously received training fields associated with the first RAT and the number of previously received training fields associated with the second RAT. If first wireless device 605 determines that the probability that a training field to be received on the channel is associated with the first RAT (e.g., based on determining that a first number of previously received training fields associated with a first RAT is greater than a second number of previously received training fields associated with a second RAT), wireless device may identify an energy detection threshold associated with the first RAT to use to perform LBT procedures.

Alternatively, if first wireless device 605 determines that the probability that a training field to be received on the channel is associated with the second RAT (e.g., based on determining that a first number of previously received training fields associated with a second RAT is greater than a second number of previously received training fields associated with a first RAT), wireless device may identify an energy detection threshold associated with the second RAT to use to perform LBT procedures (e.g., −62 dBm) or a common energy detection threshold to use to perform LBT procedures. The common energy detection threshold may correspond to an energy detection threshold used by all wireless devices communicating in a shared radio frequency spectrum for performing LBT procedures (e.g., different from the energy detection threshold associated with the second RAT) in the presence of cross-RAT STFs.

In another example, first wireless device 605 may determine an energy detection threshold for performing LBT procedures based on receiving a threshold number of training fields associated with a particular RAT. For instance, if first wireless device 605 receives a threshold number (e.g., one, two, three, etc.) of training fields associated with a second RAT (e.g., cross-RAT training fields), first wireless device 605 may identify a common energy detection threshold to use to perform LBT procedures. Otherwise, first wireless device 605 may use an energy detection threshold associated with the first RAT to use to perform LBT procedures. If first wireless device 605 determines to use the common energy detection threshold for performing LBT procedures, the first wireless device may use this threshold for performing LBT procedures for a predefined amount of time (e.g., until a next transmission opportunity).

As discussed above, in some aspects, the common energy detection threshold may correspond to an energy detection threshold used by all wireless devices communicating in a shared radio frequency spectrum for performing LBT procedures. In other examples, the common energy detection threshold may correspond to an energy detection threshold associated with a first RAT or an energy detection threshold associated with a second RAT. It is to be understood that an energy detection threshold associated with a particular RAT may correspond to an energy detection threshold originally configured for wireless devices communicating using the particular RAT to use to perform LBT procedures. Further, the threshold number of training fields associated with the second RAT may be a threshold number of consecutive training fields associated with the second RAT, or a threshold number of nonconsecutive training fields associated with the second RAT received in a certain time period.

At 640, first wireless device 605 may then perform a channel access procedure using the energy detection threshold selected based on whether the received training field is associated with the first RAT or the second RAT. The channel access procedure may include initiating a countdown during which the first wireless device 605 may monitor a channel for another STF from another wireless device. If the countdown expires and the first wireless device 605 fails to receive another STF (or identify other signal energy exceeding an energy detection threshold), the first wireless device 605 may access the channel for a data transmission. At 645, the first wireless device 605 may then transmit a training field on the channel to reserve the channel for the data transmission. Because the energy detection threshold used by a wireless device for LBT procedures may be adapted based on the training fields received on a channel in a shared radio frequency spectrum, the wireless devices communicating in the shared radio frequency spectrum may generally use similar energy detection thresholds for LBT procedures. As a result, the wireless devices may have equal opportunities to access the channel.

Figure 7:
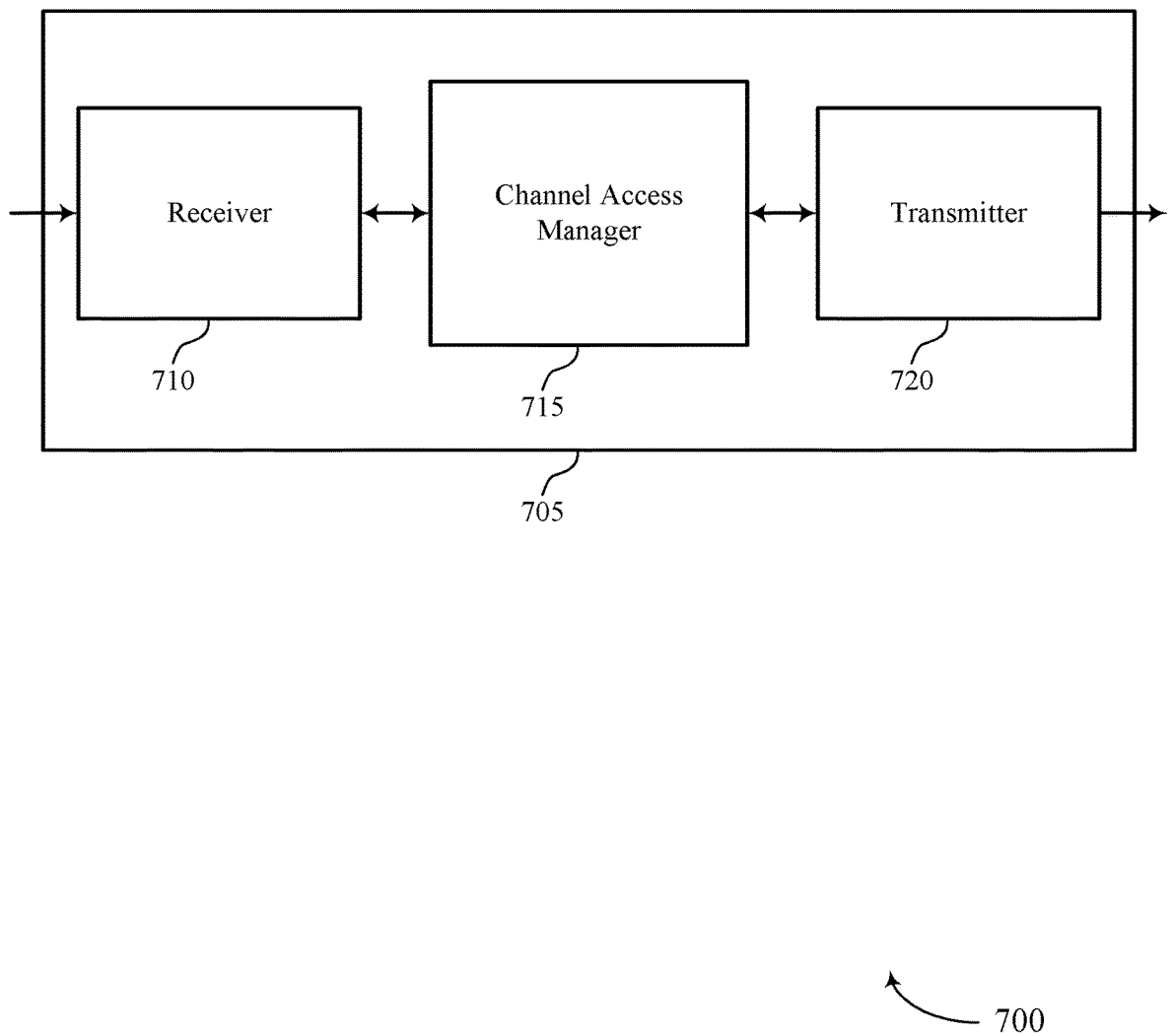
FIGS. 7 and 8 show block diagrams of a device that supports training field assisted medium sensing across multiple RATs in accordance with aspects of the present disclosure.

FIG. 7 shows a block diagram 700 of a wireless device 705 that supports training field assisted medium sensing across multiple RATs in accordance with aspects of the present disclosure. Wireless device 705 may be an example of aspects of a user equipment (UE) 115 or base station 105 as described herein. Wireless device 705 may include receiver 710, channel access manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to training field assisted medium sensing across multiple RATs, etc.). Information may be passed on to other components of the device. The receiver 710 may be an example of aspects of the transceiver 935 or the transceiver 1035 described with reference to FIGS. 9 and 10. The receiver 710 may utilize a single antenna or a set of antennas.

Channel access manager 715 may be an example of aspects of the channel access manager 915 or the channel access manager 1015 described with reference to FIGS. 9 and 10. Channel access manager 715 and/or at least some of its various sub-components may be implemented in hardware, software executed by a processor, firmware, or any combination thereof. If implemented in software executed by a processor, the functions of the channel access manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The channel access manager 715 and/or at least some of its various sub-components may be physically located at various positions, including being distributed such that portions of functions are implemented at different physical locations by one or more physical devices. In some aspects, channel access manager 715 and/or at least some of its various sub-components may be a separate and distinct component in accordance with various aspects of the present disclosure. In other examples, channel access manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Channel access manager 715 may identify, at a first wireless device, information to transmit to a second wireless device via a channel in a shared radio frequency spectrum using a first RAT, the first RAT associated with a first numerology and generate a cross-RAT training field using the first numerology (e.g., based on identifying the information to transmit), the cross-RAT training field having an autocorrelation property, the autocorrelation property associated with a set of subcarriers and a repetition period of a training field for a second RAT associated with a second numerology. Channel access manager 715 may then coordinate with transmitter 720 to transmit the cross-RAT training field on the channel to reserve the channel for transmitting the information.

The channel access manager 715 may also monitor a channel in a shared radio frequency spectrum to determine an availability of the channel for a transmission using a first RAT, detect a training field of a signal on the channel based on the monitoring, determine that the training field was transmitted by a device associated with a second RAT based on a failure to detect a second field in the signal associated with transmissions using the first RAT, detect a reference energy level of the signal based on the training field, identify an end of a transmission opportunity associated with the signal based on detecting that the energy level of the channel is below an energy threshold for a predefined time period, where the energy threshold is based on the reference energy level of the signal, and resume a channel access procedure to access the channel for the transmission based on the identified end of the transmission opportunity.

The channel access manager 715 may also monitor a channel in a shared radio frequency spectrum to determine an availability of the channel for a transmission using a first RAT, detect a training field of a signal on the channel based on the monitoring, determine that the training field was transmitted by a device associated with a second RAT based on a failure to detect a second field in the signal associated with transmissions using the first RAT, identify a transmission opportunity backoff time period based on determining that the training field is associated with the second RAT, and resume a channel access procedure to access the channel for the transmission after the transmission opportunity backoff time period.

The channel access manager 715 may also monitor a channel in a shared radio frequency spectrum using a first energy detection threshold to determine an availability of the channel for a transmission using a first RAT, receive a training field on the channel based on the monitoring, determine whether the training field is associated with the first RAT or a second RAT, identify a second energy detection threshold for monitoring the channel based on the determining, and monitor the channel using the second energy detection threshold to determine the availability of the channel for the transmission using the first RAT.

Transmitter 720 may transmit signals generated by other components of the device. In some aspects, the transmitter 720 may be collocated with a receiver 710 in a transceiver module. For example, the transmitter 720 may be an example of aspects of the transceiver 935 or the transceiver 1035 described with reference to FIGS. 9 and 10. The transmitter 720 may utilize a single antenna or a set of antennas.

Figure 8:
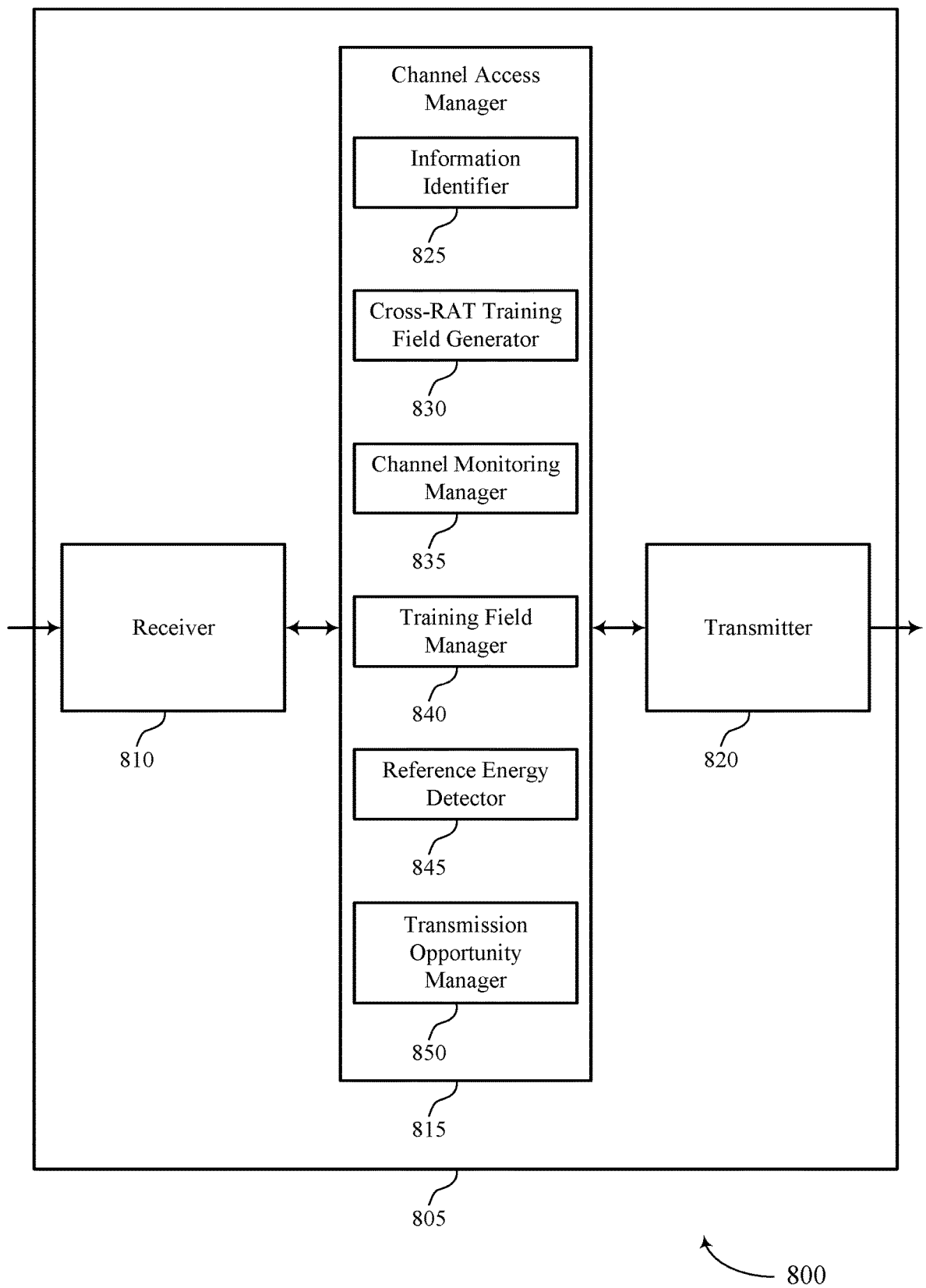

FIG. 8 shows a block diagram 800 of a wireless device 805 that supports training field assisted medium sensing across multiple RATs in accordance with aspects of the present disclosure. Wireless device 805 may be an example of aspects of a wireless device 705 or a UE 115 or base station 105 as described with reference to FIG. 7. Wireless device 805 may include receiver 810, channel access manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to training field assisted medium sensing across multiple RATs, etc.). Information may be passed on to other components of the device. The receiver 810 may be an example of aspects of the transceiver 935 or the transceiver 1035 described with reference to FIGS. 9 and 10. The receiver 810 may utilize a single antenna or a set of antennas.

Channel access manager 815 may be an example of aspects of the channel access manager 915 or the channel access manager 1015 described with reference to FIGS. 9 and 10. Channel access manager 815 may include information identifier 825, cross-RAT training field generator 830, channel monitoring manager 835, training field manager 840, reference energy detector 845, and transmission opportunity manager 850.

Information identifier 825 may identify, at a first wireless device (e.g., wireless device 805), information to transmit to a second wireless device via a channel in a shared radio frequency spectrum using a first RAT, the first RAT associated with a first numerology. Cross-RAT training field generator 830 may generate a cross-RAT training field using the first numerology (e.g., based on identifying the information to transmit), the cross-RAT training field having an autocorrelation property, the autocorrelation property associated with a set of subcarriers and a repetition period of a training field for a second RAT associated with a second numerology. In some cases, the generating includes generating the cross-RAT training field using a sampling duration that is an integer fraction of the first symbol duration. Cross-RAT training field generator 830 may then coordinate with transmitter 820 to transmit the cross-RAT training field on the channel to reserve the channel for transmitting the information.

In some cases, the first numerology includes a first subcarrier spacing and a first symbol duration, and the second numerology includes a second subcarrier spacing different from the first subcarrier spacing and a second symbol duration different from the first symbol duration. In some cases, a number of null subcarriers between subcarriers of the cross-RAT training field is different from a number of null subcarriers between subcarriers in the set of subcarriers of the training field for the second RAT. In some cases, a difference between a first duration of a first time period spanned by the cross-RAT training field and a second duration of a second time period spanned by the training field for the second RAT is within a threshold.

In some aspects, channel monitoring manager 835 may monitor a channel in a shared radio frequency spectrum to determine an availability of the channel for a transmission using a first RAT. Training field manager 840 may detect a training field of a signal on the channel based on the monitoring. Training field manager 840 may then determine that the training field was transmitted by a device associated with a second RAT based on a failure to detect a second field in the signal associated with transmissions using the first RAT. Reference energy detector 845 may detect a reference energy level of the signal based on the training field, and transmission opportunity manager 850 may identify an end of a transmission opportunity associated with the signal based on detecting that the energy level of the channel is below an energy threshold for a predefined time period, where the energy threshold is based on the reference energy level of the signal. Channel access manager 815 may then resume a channel access procedure to access the channel for the transmission based on the identified end of the transmission opportunity.

Channel monitoring manager 835 may monitor the channel to determine the availability of the channel for the transmission as part of the channel access procedure. Training field manager 840 may detect a second training field of a second signal on the channel and identify that the second training field was transmitted by a second device associated with the second RAT based on a failure to detect the second field in the signal associated with transmissions using the first RAT. Reference energy detector 845 may detect a second reference energy level of the second signal based on the second training field, and channel access manager 815 may then resume the channel access procedure to access the channel for the transmission based on determining that the second reference energy level is below an edge detection energy threshold.

In some cases, the second field includes an LTF or an L-SIG field, and, in other cases, the second field includes a DCI field. In some cases, the reference energy level is determined based on energy detected within a predetermined time duration after the training field. In some cases, the channel access procedure includes a countdown of a backoff timer prior to channel access for the transmission.

In other aspects, channel monitoring manager 835 may monitor a channel in a shared radio frequency spectrum to determine an availability of the channel for a transmission using a first RAT. Training field manager 840 may detect a training field of a signal on the channel based on the monitoring. Training field manager 840 may then determine that the training field was transmitted by a device associated with a second RAT based on a failure to detect a second field in the signal associated with transmissions using the first RAT. Transmission opportunity manager 850 may identify a transmission opportunity backoff time period based on determining that the training field is associated with the second RAT. Channel access manager 815 may then resume a channel access procedure to access the channel for the transmission after the transmission opportunity backoff time period. In some cases, the second field includes an LTF or an L-SIG field, and, in other cases, the second field includes a DCI field.

In some cases, training field manager 840 may receive a threshold number of subsequent training fields transmitted on the channel by one or more devices associated with the second RAT, where each of the subsequent training fields is received within a respective backoff time period of a previous training field. Channel access manager 815 may then resume the channel access procedure to access the channel for the transmission based on receiving the threshold number of subsequent training fields. In some cases, a duration of the transmission opportunity backoff time period corresponds to a maximum duration of a transmission opportunity on the channel for the first RAT and the second RAT. In some cases, the channel access procedure includes a countdown of a backoff timer prior to channel access for the transmission.

In yet other aspects, channel monitoring manager 835 may monitor a channel in a shared radio frequency spectrum using a first energy detection threshold to determine an availability of the channel for a transmission using a first RAT. Training field manager 840 may then receive a training field on the channel based on the monitoring and may determine whether the training field is associated with the first RAT or a second RAT. Channel monitoring manager 835 may then identify a second energy detection threshold for monitoring the channel based on the determining and monitor the channel using the second energy detection threshold to determine the availability of the channel for the transmission using the first RAT.

In some cases, training field manager 840 may determine that a probability of detecting training fields associated with the first RAT above a threshold based on a number of previously received training fields associated with the first RAT and a number of previously received training fields associated with the second RAT, and channel monitoring manager 835 may select an energy detection threshold associated with the first RAT as the second energy detection threshold for the monitoring. In other cases, training field manager 840 may determine that a probability of detecting training fields associated with the second RAT is above a threshold based on a number of previously received training fields associated with the first RAT and a number of previously received training fields associated with the second RAT, and channel monitoring manager 835 may select an energy detection threshold associated with the second RAT as the second energy detection threshold for the monitoring.

In some cases, training field manager 840 may detect a threshold number of training fields associated with the second RAT on the channel, and channel monitoring manager 835 may select a common energy detection threshold associated with the first RAT and the second RAT based on the detecting the threshold number of training fields associated with the second RAT. In such cases, monitoring the channel using the second energy detection threshold includes monitoring the channel using the common energy detection threshold for a predefined time period. In some cases, training field manager 840 may fail to detect a second field associated with transmissions using the first RAT or the second RAT, and training field manager 840 may determine that the training field is associated with the first RAT or the second RAT based on failing to detect the second field. In some cases, the second field includes an LTF or an L-SIG field, and, in other cases, the second field includes a DCI field.

Transmitter 820 may transmit signals generated by other components of the device. In some aspects, the transmitter 820 may be collocated with a receiver 810 in a transceiver module. For example, the transmitter 820 may be an example of aspects of the transceiver 935 or the transceiver 1035 described with reference to FIGS. 9 and 10. The transmitter 820 may utilize a single antenna or a set of antennas.

Figure 9:
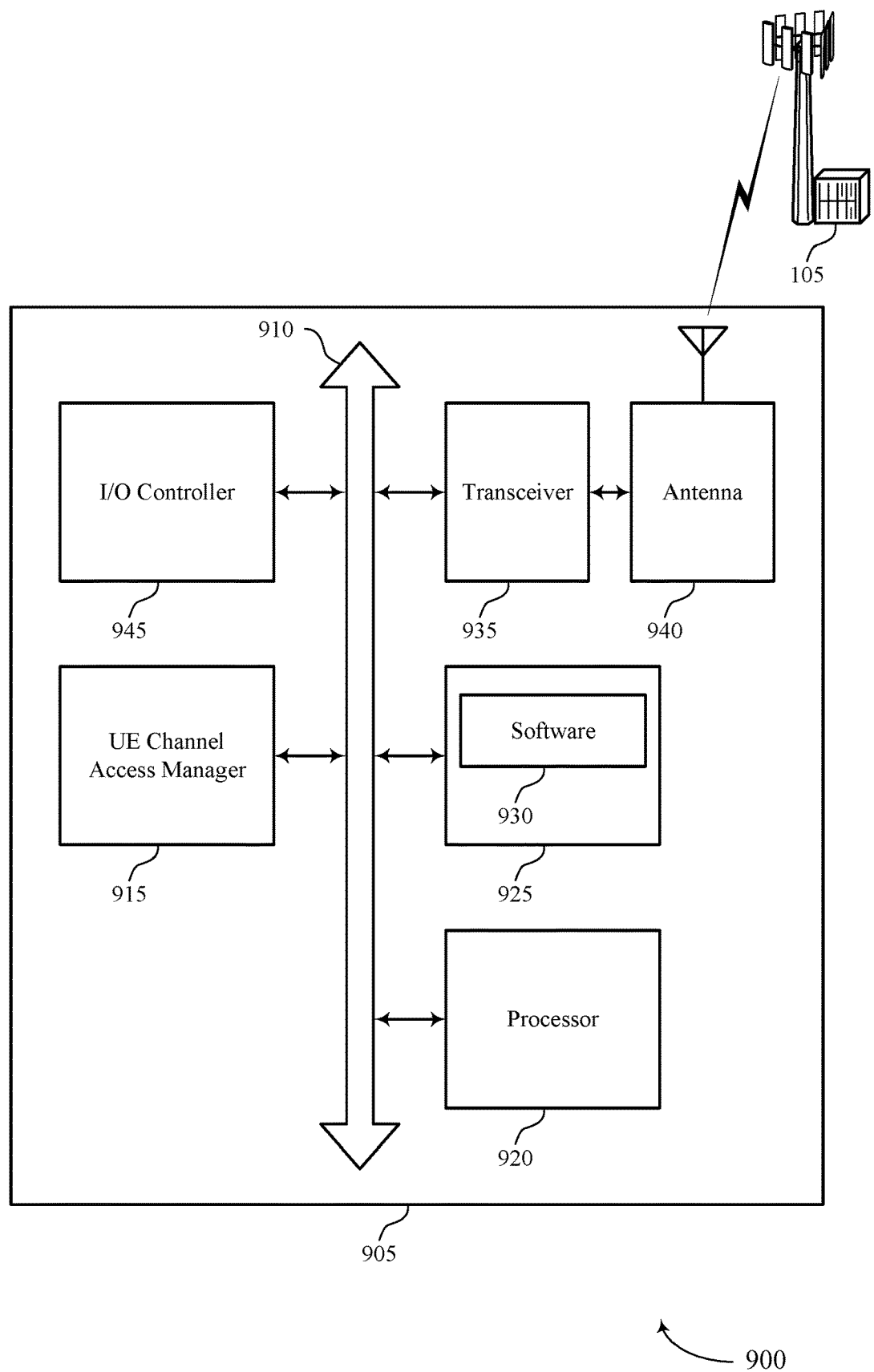
FIG. 9 illustrates a block diagram of a system including a user equipment (UE) that supports training field assisted medium sensing across multiple RATs in accordance with aspects of the present disclosure.

FIG. 9 shows a diagram of a system 900 including a device 905 that supports training field assisted medium sensing across multiple RATs in accordance with aspects of the present disclosure. Device 905 may be an example of or include the components of wireless device 705, wireless device 805, or a UE 115 as described above, e.g., with reference to FIGS. 7 and 8. Device 905 may include components for bi-directional voice and data communications including components for transmitting and receiving communications, including UE channel access manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting training field assisted medium sensing across multiple RATs).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support training field assisted medium sensing across multiple RATs. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
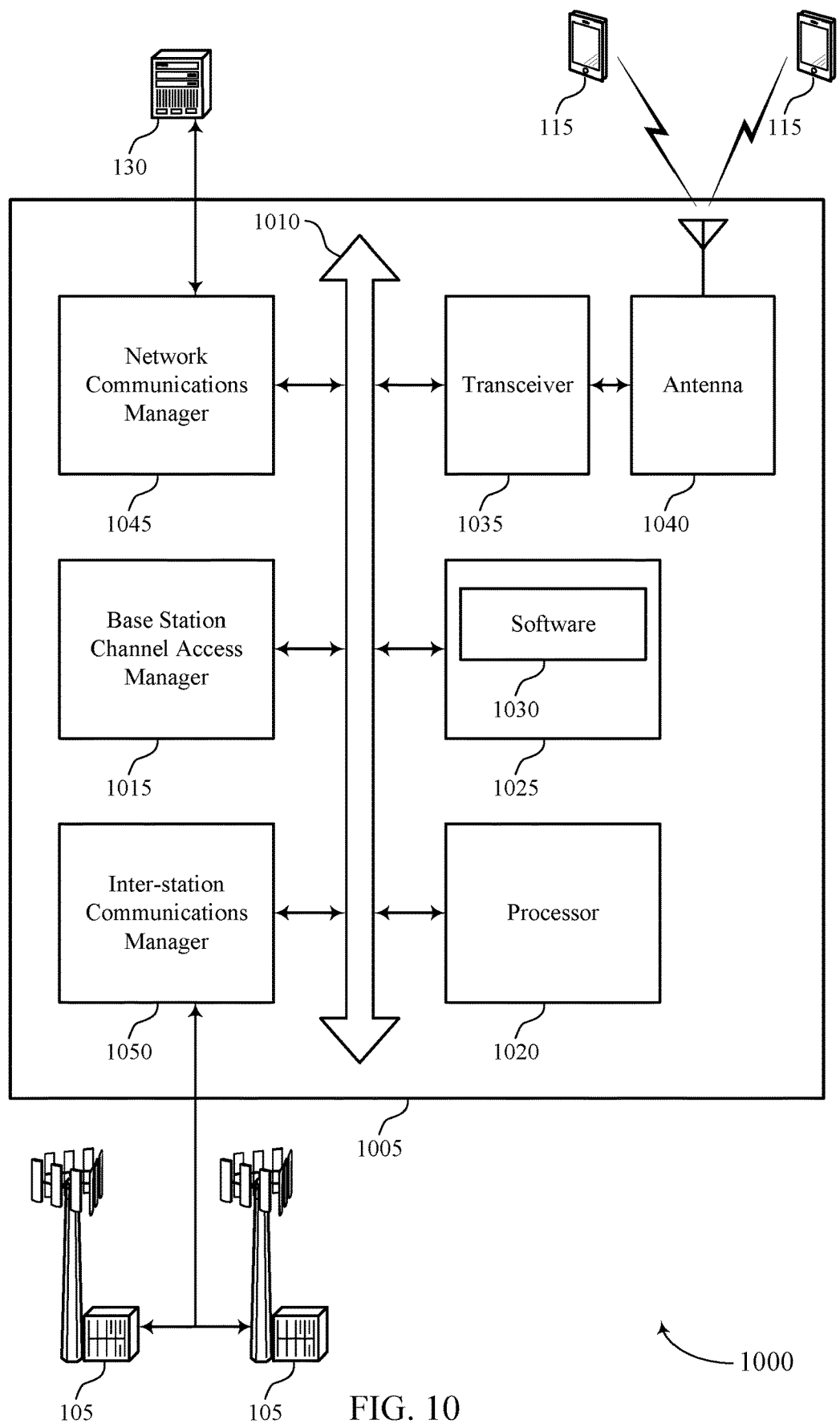
FIG. 10 illustrates a block diagram of a system including a base station that supports training field assisted medium sensing across multiple RATs in accordance with aspects of the present disclosure.

FIG. 10 shows a diagram of a system 1000 including a device 1005 that supports training field assisted medium sensing across multiple RATs in accordance with aspects of the present disclosure. Device 1005 may be an example of or include the components of wireless device 705, wireless device 805, or a base station 105 as described above, e.g., with reference to FIGS. 7, and 8. Device 1005 may include components for bi-directional voice and data communications including components for transmitting and receiving communications, including base station channel access manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting training field assisted medium sensing across multiple RATs).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware or software operation such as the interaction with peripheral components or devices.

Software 1030 may include code to implement aspects of the present disclosure, including code to support training field assisted medium sensing across multiple RATs. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base stations 105 and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some aspects, inter-station communications manager 1050 may provide an X2 interface within an LTE/LTE-A wireless communication network technology to provide communication between base stations 105.

Figure 11:
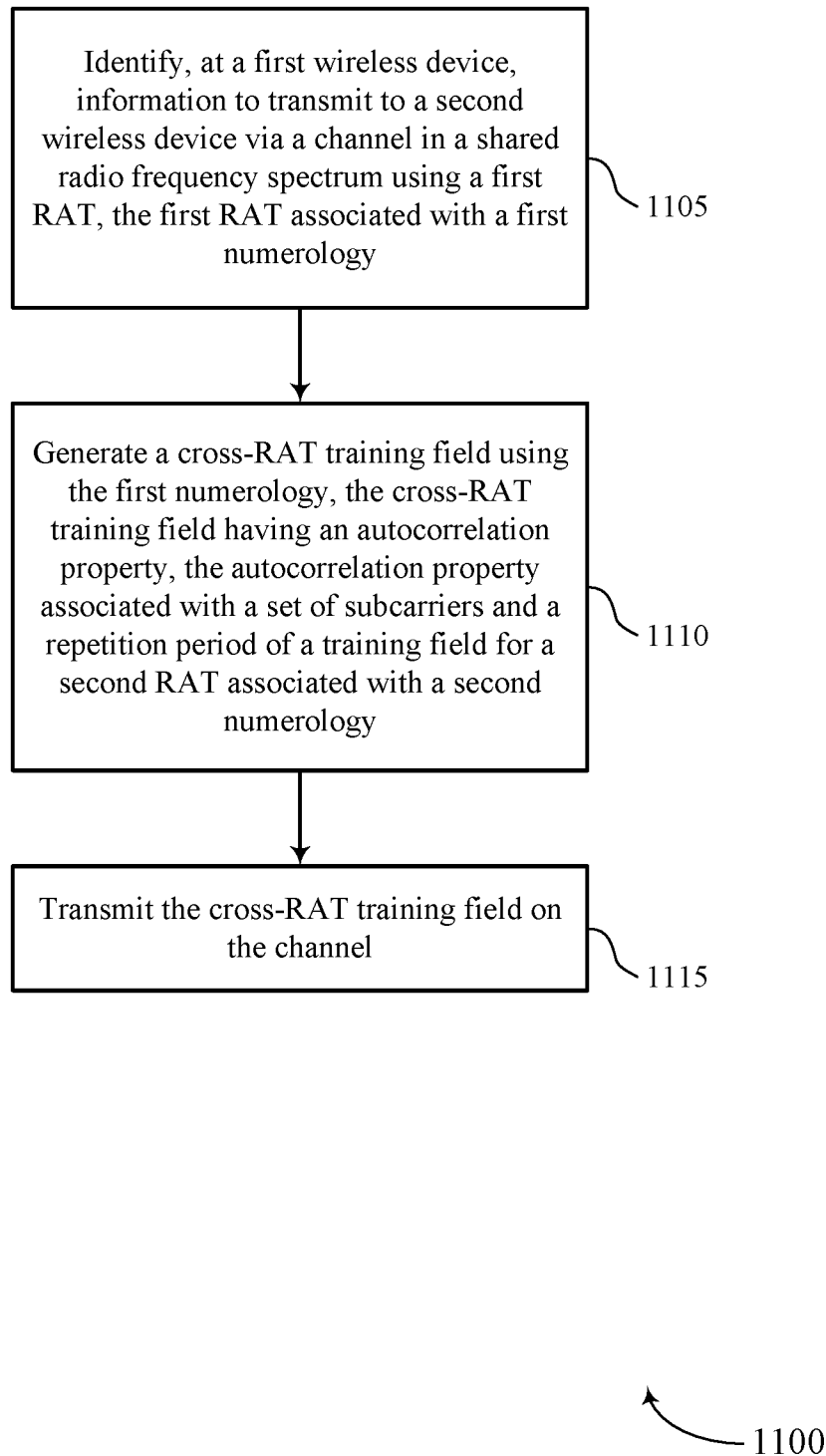
FIGS. 11-14 illustrate methods for training field assisted medium sensing across multiple RATs in accordance with aspects of the present disclosure.

FIG. 11 shows a flowchart illustrating a method 1100 for training field assisted medium sensing across multiple RATs in accordance with aspects of the present disclosure. The operations of method 1100 may be implemented by a UE 115 or base station 105 or its components as described herein. For example, the operations of method 1100 may be performed by a channel access manager as described with reference to FIGS. 7 and 8. In some aspects, a UE 115 or base station 105 may execute a set of codes to control the functional elements of the device to perform the functions described below. Additionally, or alternatively, the UE 115 or base station 105 may perform aspects of the functions described below using special-purpose hardware.

At 1105 the UE 115 or base station 105 may identify, at a first wireless device, information to transmit to a second wireless device via a channel in a shared radio frequency spectrum using a first RAT, the first RAT associated with a first numerology. The operations of 1105 may be performed according to the methods described herein. In certain examples, aspects of the operations of 1105 may be performed by an information identifier as described with reference to FIGS. 7 and 8.

At 1110 the UE 115 or base station 105 may generate a cross-RAT training field using the first numerology, the cross-RAT training field having an autocorrelation property, the autocorrelation property associated with a set of subcarriers and a repetition period of a training field for a second RAT associated with a second numerology. The operations of 1110 may be performed according to the methods described herein. In certain examples, aspects of the operations of 1110 may be performed by a cross-RAT training field generator as described with reference to FIGS. 7 and 8.

At 1115 the UE 115 or base station 105 may transmit the cross-RAT training field on the channel to reserve the channel for transmitting the information. The operations of 1115 may be performed according to the methods described herein. In certain examples, aspects of the operations of 1115 may be performed by a transmitter as described with reference to FIGS. 7 and 8.

Figure 12:
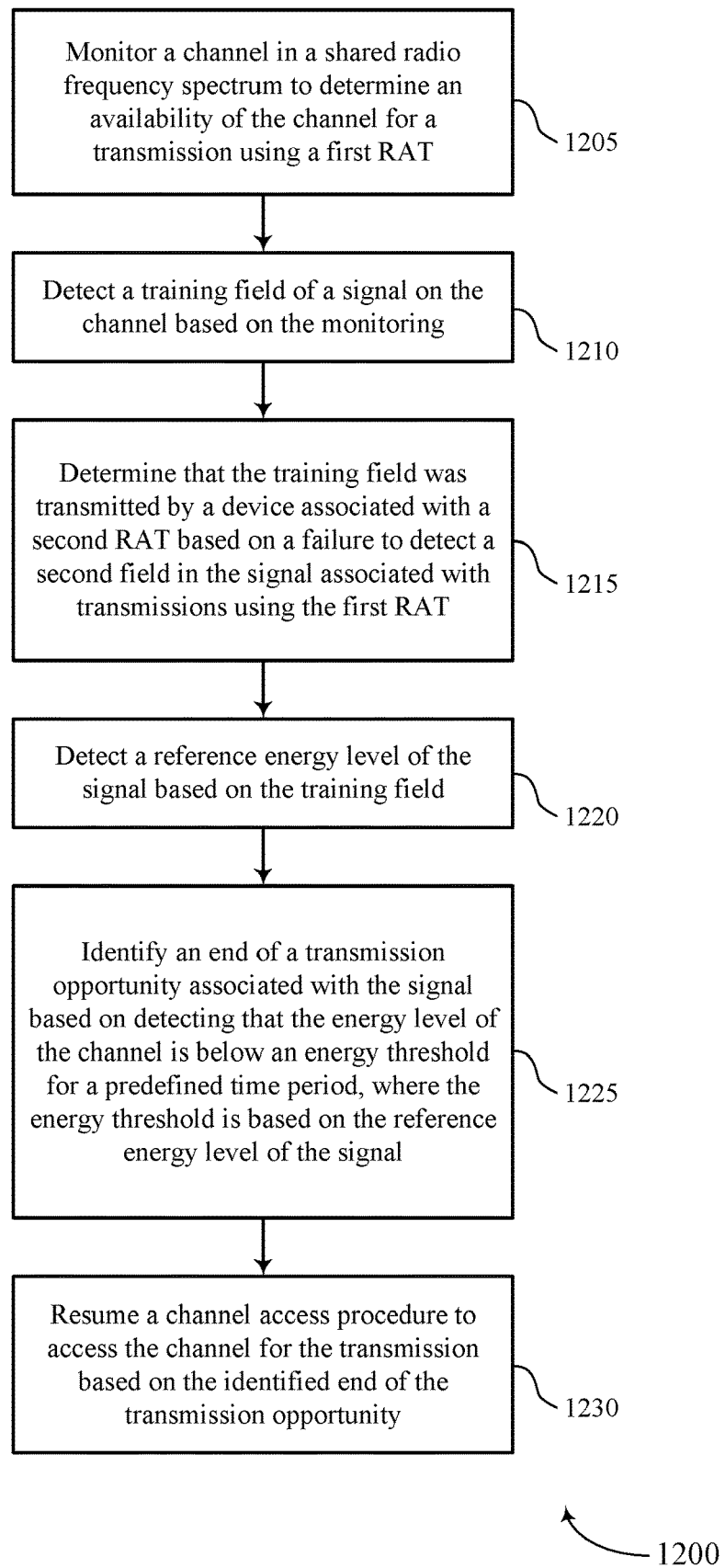

FIG. 12 shows a flowchart illustrating a method 1200 for training field assisted medium sensing across multiple RATs in accordance with aspects of the present disclosure. The operations of method 1200 may be implemented by a UE 115 or base station 105 or its components as described herein. For example, the operations of method 1200 may be performed by a channel access manager as described with reference to FIGS. 7 and 8. In some aspects, a UE 115 or base station 105 may execute a set of codes to control the functional elements of the device to perform the functions described below. Additionally, or alternatively, the UE 115 or base station 105 may perform aspects of the functions described below using special-purpose hardware.

At 1205 the UE 115 or base station 105 may monitor a channel in a shared radio frequency spectrum to determine an availability of the channel for a transmission using a first RAT. The operations of 1205 may be performed according to the methods described herein. In certain examples, aspects of the operations of 1205 may be performed by a channel monitoring manager as described with reference to FIGS. 7 and 8.

At 1210 the UE 115 or base station 105 may detect a training field of a signal on the channel based at least in part on the monitoring. The operations of 1210 may be performed according to the methods described herein. In certain examples, aspects of the operations of 1210 may be performed by a training field manager as described with reference to FIGS. 7 and 8.

At 1215 the UE 115 or base station 105 may determine that the training field was transmitted by a device associated with a second RAT based at least in part on a failure to detect a second field in the signal associated with transmissions using the first RAT. The operations of 1215 may be performed according to the methods described herein. In certain examples, aspects of the operations of 1215 may be performed by a training field manager as described with reference to FIGS. 7 and 8.

At 1220 the UE 115 or base station 105 may detect a reference energy level of the signal based at least in part on the training field. The operations of 1220 may be performed according to the methods described herein. In certain examples, aspects of the operations of 1220 may be performed by a reference energy detector as described with reference to FIGS. 7 and 8.

At 1225 the UE 115 or base station 105 may identify an end of a transmission opportunity associated with the signal based at least in part on detecting that the energy level of the channel is below an energy threshold for a predefined time period, where the energy threshold is based at least in part on the reference energy level of the signal. The operations of 1225 may be performed according to the methods described herein. In certain examples, aspects of the operations of 1225 may be performed by a transmission opportunity manager as described with reference to FIGS. 7 and 8.

At 1230 the UE 115 or base station 105 may resume a channel access procedure to access the channel for the transmission based at least in part on the identified end of the transmission opportunity. The operations of 1230 may be performed according to the methods described herein. In certain examples, aspects of the operations of 1230 may be performed by a channel access manager as described with reference to FIGS. 7 and 8.

Figure 13:
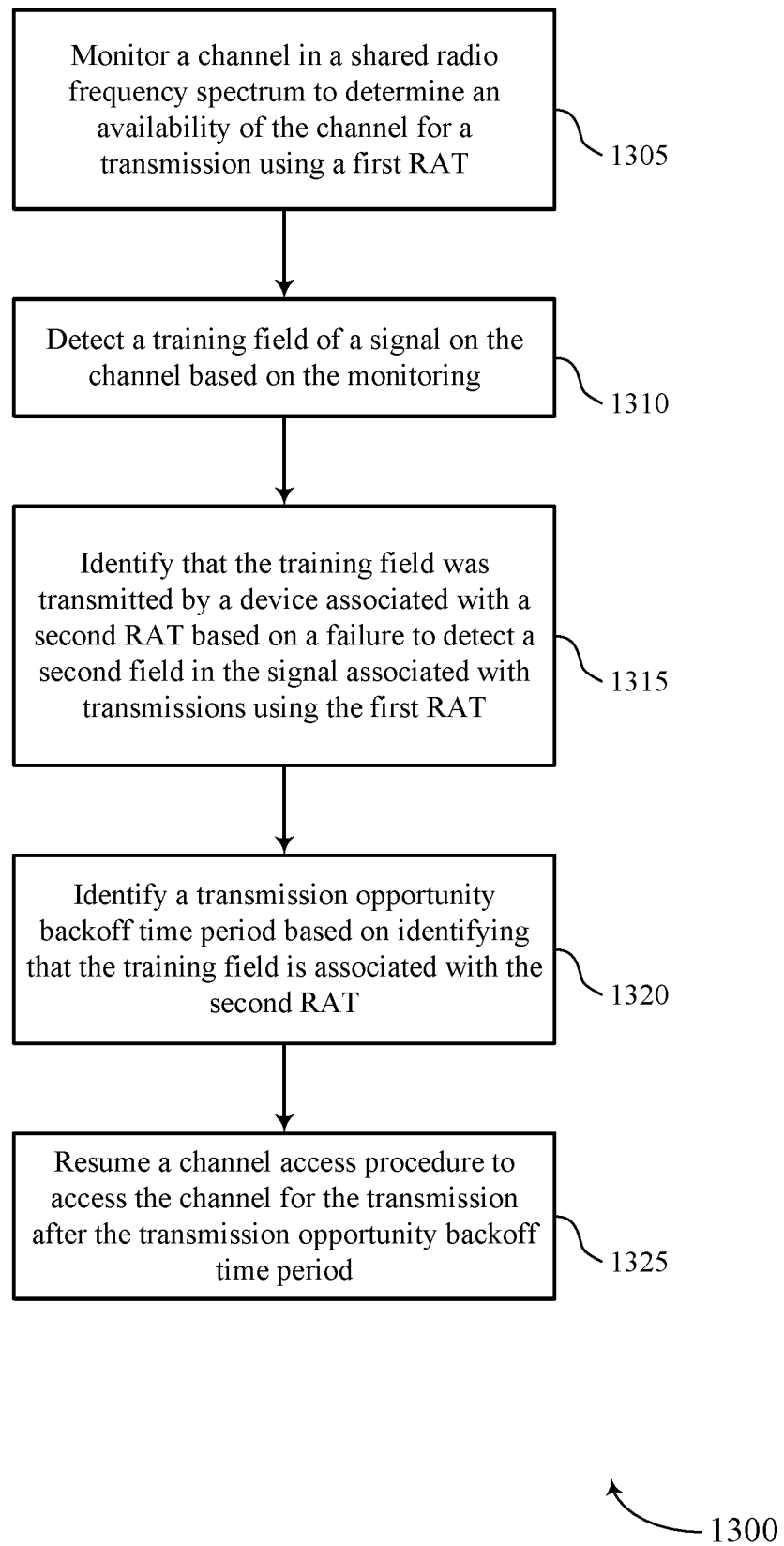

FIG. 13 shows a flowchart illustrating a method 1300 for training field assisted medium sensing across multiple RATs in accordance with aspects of the present disclosure. The operations of method 1300 may be implemented by a UE 115 or base station 105 or its components as described herein. For example, the operations of method 1300 may be performed by a channel access manager as described with reference to FIGS. 7 and 8. In some aspects, a UE 115 or base station 105 may execute a set of codes to control the functional elements of the device to perform the functions described below. Additionally, or alternatively, the UE 115 or base station 105 may perform aspects of the functions described below using special-purpose hardware.

At 1305 the UE 115 or base station 105 may monitor a channel in a shared radio frequency spectrum to determine an availability of the channel for a transmission using a first RAT. The operations of 1305 may be performed according to the methods described herein. In certain examples, aspects of the operations of 1305 may be performed by a channel monitoring manager as described with reference to FIGS. 7 and 8.

At 1310 the UE 115 or base station 105 may detect a training field of a signal on the channel based at least in part on the monitoring. The operations of 1310 may be performed according to the methods described herein. In certain examples, aspects of the operations of 1310 may be performed by a training field manager as described with reference to FIGS. 7 and 8.

At 1315 the UE 115 or base station 105 may determine that the training field was transmitted by a device associated with a second RAT based at least in part on a failure to detect a second field in the signal associated with transmissions using the first RAT. The operations of 1315 may be performed according to the methods described herein. In certain examples, aspects of the operations of 1315 may be performed by a training field manager as described with reference to FIGS. 7 and 8.

At 1320 the UE 115 or base station 105 may identify a transmission opportunity backoff time period based at least in part on determining that the training field is associated with the second RAT. The operations of 1320 may be performed according to the methods described herein. In certain examples, aspects of the operations of 1320 may be performed by a transmission opportunity manager as described with reference to FIGS. 7 and 8.

At 1325 the UE 115 or base station 105 may resume a channel access procedure to access the channel for the transmission after the transmission opportunity backoff time period. The operations of 1325 may be performed according to the methods described herein. In certain examples, aspects of the operations of 1325 may be performed by a channel access manager as described with reference to FIGS. 7 and 8.

Figure 14:
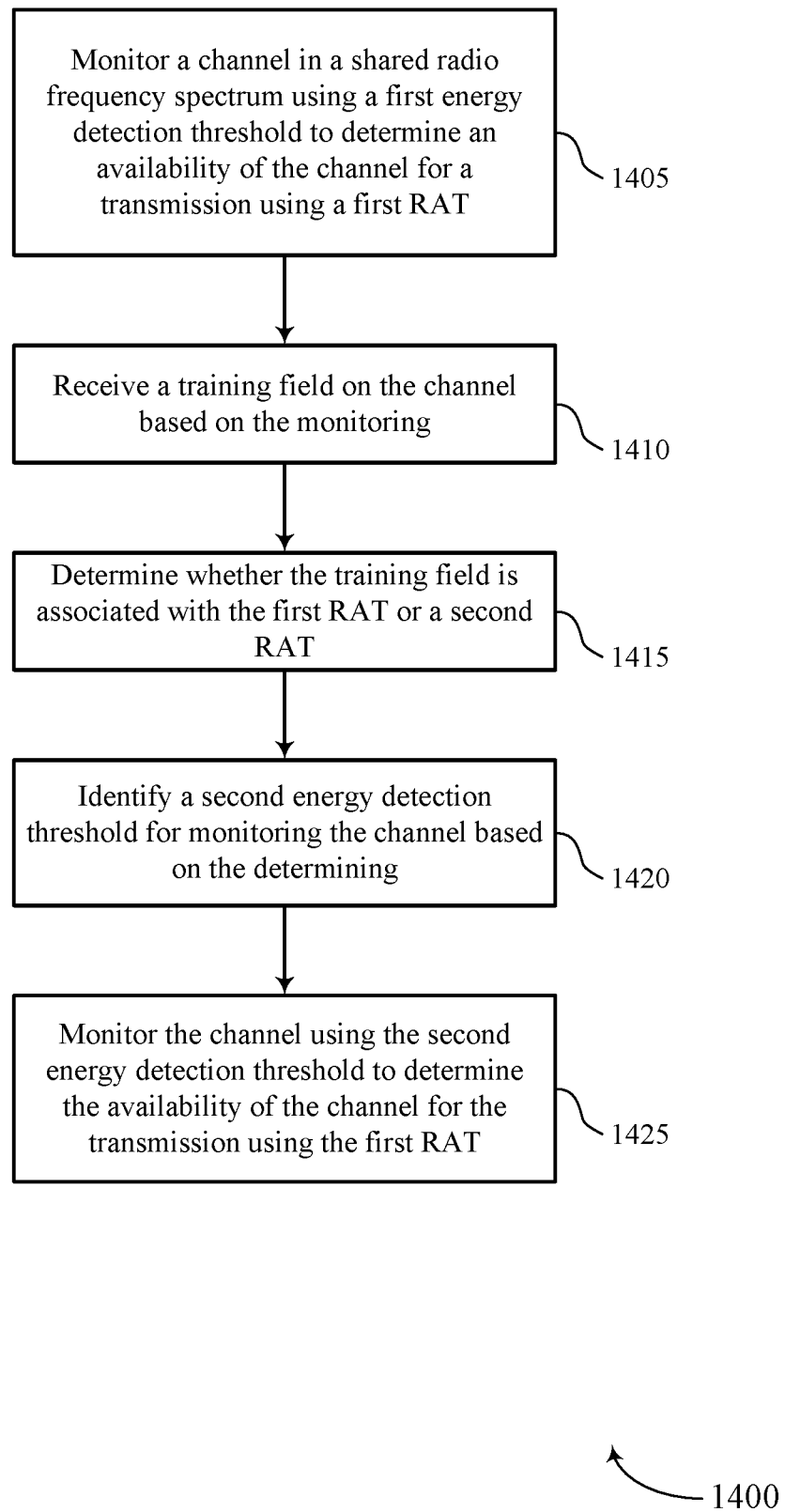

FIG. 14 shows a flowchart illustrating a method 1400 for training field assisted medium sensing across multiple RATs in accordance with aspects of the present disclosure. The operations of method 1400 may be implemented by a UE 115 or base station 105 or its components as described herein. For example, the operations of method 1400 may be performed by a channel access manager as described with reference to FIGS. 7 and 8. In some aspects, a UE 115 or base station 105 may execute a set of codes to control the functional elements of the device to perform the functions described below. Additionally, or alternatively, the UE 115 or base station 105 may perform aspects of the functions described below using special-purpose hardware.

At 1405 the UE 115 or base station 105 may monitor a channel in a shared radio frequency spectrum using a first energy detection threshold to determine an availability of the channel for a transmission using a first RAT. The operations of 1405 may be performed according to the methods described herein. In certain examples, aspects of the operations of 1405 may be performed by a channel monitoring manager as described with reference to FIGS. 7 and 8.

At 1410 the UE 115 or base station 105 may receive a training field on the channel based at least in part on the monitoring. The operations of 1410 may be performed according to the methods described herein. In certain examples, aspects of the operations of 1410 may be performed by a training field manager as described with reference to FIGS. 7 and 8.

At 1415 the UE 115 or base station 105 may determine whether the training field is associated with the first RAT or a second RAT. The operations of 1415 may be performed according to the methods described herein. In certain examples, aspects of the operations of 1415 may be performed by a training field manager as described with reference to FIGS. 7 and 8.

At 1420 the UE 115 or base station 105 may identify a second energy detection threshold for monitoring the channel based at least in part on the determining. The operations of 1420 may be performed according to the methods described herein. In certain examples, aspects of the operations of 1420 may be performed by a channel monitoring manager as described with reference to FIGS. 7 and 8.

At 1425 the UE 115 or base station 105 may monitor the channel using the second energy detection threshold to determine the availability of the channel for the transmission using the first RAT. The operations of 1425 may be performed according to the methods described herein. In certain examples, aspects of the operations of 1425 may be performed by a channel monitoring manager as described with reference to FIGS. 7 and 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying, at a first wireless device, information to transmit to a second wireless device via a channel in a shared radio frequency spectrum using a first radio access technology (RAT), the first RAT associated with a first numerology having a first subcarrier spacing and a first symbol duration;
generating a signal for a cross-RAT training field using a first set of subcarriers of the first numerology, wherein spacing between the first set of subcarriers is an integer multiple of the first subcarrier spacing and the cross-RAT training field is associated with a first repetition period that is an integer multiple of the first symbol duration, and wherein the signal has an autocorrelation property associated with a second set of subcarriers and a second repetition period of a training field for a second RAT associated with a second numerology having a second subcarrier spacing, the second repetition period being different from the first repetition period; and
transmitting the cross-RAT training field on the channel to reserve the channel for transmitting the information.

2. The method of claim 1, wherein the first numerology comprises the first subcarrier spacing and the first symbol duration, and wherein the second numerology comprises the second subcarrier spacing different from the first subcarrier spacing and a second symbol duration different from the first symbol duration.

3. The method of claim 2, wherein the generating comprises:
generating the signal for the cross-RAT training field using a sampling duration that is an integer fraction of the first symbol duration.

4. The method of claim 2, wherein a number of null subcarriers between the first set of subcarriers of the signal for the cross-RAT training field is different from a number of null subcarriers between subcarriers in the second set of subcarriers of the training field for the second RAT.

5. The method of claim 1, wherein a difference between a first duration of a first time period spanned by the cross-RAT training field and a second duration of a second time period spanned by the training field for the second RAT is within a threshold.

6. The method of claim 1, wherein the cross-RAT training field comprises a short training field (STF).

7. A method for wireless communication, comprising:
monitoring a channel in a shared radio frequency spectrum using a first energy detection threshold to determine an availability of the channel for a transmission using a first radio access technology (RAT);
receiving a training field on the channel based at least in part on the monitoring;
identifying the training field as being associated with the first RAT or a second RAT;
determining that a probability of detecting training fields associated with the second RAT is above a threshold based at least in part on a number of previously received training fields associated with the first RAT and a number of previously received training fields associated with the second RAT;
identifying a second energy detection threshold associated with the second RAT for monitoring the channel based at least in part on the determining; and
monitoring the channel using the second energy detection threshold to determine the availability of the channel for the transmission using the first RAT.

8. The method of claim 7, further comprising:
determining that a probability of detecting training fields associated with the first RAT is above a threshold based at least in part on the number of previously received training fields associated with the first RAT and the number of previously received training fields associated with the second RAT; and
selecting an energy detection threshold associated with the first RAT as the second energy detection threshold for the monitoring.

9. The method of claim 7, further comprising:
detecting a threshold number of training fields associated with the second RAT on the channel; and
selecting a common energy detection threshold associated with the first RAT and the second RAT based on the detecting the threshold number of training fields associated with the second RAT.

10. The method of claim 9, wherein monitoring the channel using the second energy detection threshold comprises:
monitoring the channel using the common energy detection threshold for a predefined time period.

11. The method of claim 7, wherein determining that the training field is associated with the first RAT or the second RAT comprises:
failing to detect a second field associated with transmissions using the first RAT or the second RAT; and
determining that the training field is associated with the first RAT or the second RAT based at least in part on failing to detect the second field.

12. The method of claim 11, wherein the second field comprises a long training field (LTF) or a legacy signal (L-SIG) field.

13. The method of claim 11, wherein the second field comprises a downlink control information (DCI) field.

14. An apparatus for wireless communication, comprising:
a processor;
memory coupled to the processor; and
instructions stored in the memory and executable by the processor to cause the apparatus to:
identify, at a first wireless device, information to transmit to a second wireless device via a channel in a shared radio frequency spectrum using a first radio access technology (RAT), the first RAT associated with a first numerology having a first subcarrier spacing and a first symbol duration;
generate a signal for a cross-RAT training field using a first set of subcarriers of the first numerology, wherein spacing between the first set of subcarriers is an integer multiple of the first subcarrier spacing and the cross-RAT training field is associated with a first repetition period that is an integer multiple of the first symbol duration, and wherein the signal has an autocorrelation property associated with a second set of subcarriers and a second repetition period of a training field for a second RAT associated with a second numerology having a second subcarrier spacing, the second repetition period being different from the first repetition period; and transmit the cross-RAT training field on the channel to reserve the channel for transmitting the information.

15. The apparatus of claim 14, wherein the first numerology comprises the first subcarrier spacing and DB the first symbol duration, and wherein the second numerology comprises the second subcarrier spacing different from the first subcarrier spacing and a second symbol duration different from the first symbol duration.

16. The apparatus of claim 15, wherein the instructions to the generating are executable by the processor to cause the apparatus to:

generate the signal for the cross-RAT training field using a sampling duration that is an integer fraction of the first symbol duration.

17. The apparatus of claim 15, wherein a number of null subcarriers between the first set of subcarriers of the signal for the cross-RAT training field is different from a number of null subcarriers between subcarriers in the second set of subcarriers of the training field for the second RAT.

18. The apparatus of claim 14, wherein a difference between a first duration of a first time period spanned by the cross-RAT training field and a second duration of a second time period spanned by the training field for the second RAT is within a threshold.

19. The apparatus of claim 14, wherein the cross-RAT training field comprises a short training field (STF).

20. An apparatus for wireless communication, comprising:

a processor;
memory coupled to the processor; and
instructions stored in the memory and executable by the processor to cause the apparatus to:
monitor a channel in a shared radio frequency spectrum using a first energy detection threshold to determine an availability of the channel for a transmission using a first radio access technology (RAT);
receive a training field on the channel based at least in part on the monitoring;
identify the training field as being associated with the first RAT or a second RAT;
determine that a probability of detecting training fields associated with the second RAT is above a threshold based at least in part on a number of previously received training fields associated with the second RAT;
identify a second energy detection threshold associated with the second RAT for monitoring the channel based at least in part on the determining; and
monitor the channel using the second energy detection threshold to determine the availability of the channel for the transmission using the first RAT.

21. The apparatus of claim 20, wherein the instructions are further executable by the processor to cause the apparatus to:

determine that a probability of detecting training fields associated with the first RAT is above a threshold based at least in part on the number of previously received training fields associated with the first RAT and the number of previously received training fields associated with the second RAT; and select an energy detection threshold associated with the first RAT as the second energy detection threshold for the monitoring.

22. The apparatus of claim 20, wherein the instructions are further executable by the processor to cause the apparatus to:

detect a threshold number of training fields associated with the second RAT on the channel; and select a common energy detection threshold associated with the first RAT and the second RAT based on the detecting the threshold number of training fields associated with the second RAT.

23. The apparatus of claim 22, wherein the instructions to monitor the channel using the second energy detection threshold are executable by the processor to cause the apparatus to:

monitor the channel using the common energy detection threshold for a predefined time period.

24. The apparatus of claim 20, wherein the instructions to determine that the training field is associated with the first RAT or the second RAT are executable by the processor to cause the apparatus to:

fail to detect a second field associated with transmissions using the first RAT or the second RAT; and determine that the training field is associated with the first RAT or the second RAT based at least in part on failing to detect the second field.

25. The apparatus of claim 24, wherein the second field comprises a long training field (LTF) or a legacy signal (L-SIG) field.

26. The apparatus of claim 24, wherein the second field comprises a downlink control information (DCI) field.

* * * * *